US010681723B2

(12) United States Patent
Radulescu et al.

(10) Patent No.: US 10,681,723 B2
(45) Date of Patent: Jun. 9, 2020

(54) TECHNIQUE FOR HARQ, MULTIPLEXING, AND CONTENTION

(71) Applicant: QUALCOMM Incorporated, San Diego, CA (US)

(72) Inventors: Andrei Dragos Radulescu, San Diego, CA (US); Chirag Patel, San Diego, CA (US); Arumugam Chendamarai Kannan, San Diego, CA (US); Tamer Kadous, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/695,167

(22) Filed: Sep. 5, 2017

(65) Prior Publication Data

US 2018/0249496 A1    Aug. 30, 2018

Related U.S. Application Data

(60) Provisional application No. 62/464,329, filed on Feb. 27, 2017.

(51) Int. Cl.
*H04W 72/14*    (2009.01)
*H04B 7/06*    (2006.01)
(Continued)

(52) U.S. Cl.
CPC .......... *H04W 72/14* (2013.01); *H04B 7/0408* (2013.01); *H04B 7/0695* (2013.01);
(Continued)

(58) Field of Classification Search
CPC .. H04W 72/14; H04W 72/046; H04L 1/1887; H04B 7/0408
See application file for complete search history.

(56) References Cited

U.S. PATENT DOCUMENTS

2010/0118752 A1* 5/2010 Suzuki ................. H04W 76/27
370/311
2014/0269544 A1  9/2014 Zhu et al.
(Continued)

FOREIGN PATENT DOCUMENTS

EP    2824971 A1    1/2015

OTHER PUBLICATIONS

Partial International Search Report—PCT/US2018/015761—ISA/EPO—dated May 2, 2018.
(Continued)

*Primary Examiner* — Min Jung
(74) *Attorney, Agent, or Firm* — Arent Fox, LLP

(57) ABSTRACT

In an aspect of the disclosure, a method, a computer-readable medium, and an apparatus for wireless communication are provided. The apparatus may be a base station. The apparatus may transmit an uplink grant to a UE during a first transmit opportunity. The apparatus may signal, during a second transmit opportunity, a grant trigger to the UE to trigger operations associated with the uplink grant that are uncompleted after the first transmit opportunity. The grant trigger may be associated with a set of UEs that includes the UE. The set of UEs may be a subset of the UEs having pending transmissions. The apparatus may instruct the UE regarding whether to keep or discard resources granted by the uplink grant when the UE switches to a different beam during or prior to the second transmit opportunity.

16 Claims, 22 Drawing Sheets

(51) Int. Cl.
    *H04L 1/18*     (2006.01)
    *H04B 7/0408*   (2017.01)
    *H04W 72/04*    (2009.01)
    *H04W 72/12*    (2009.01)
    *H04W 84/04*    (2009.01)
(52) U.S. Cl.
    CPC .......... *H04L 1/1854* (2013.01); *H04L 1/1887* (2013.01); *H04W 72/046* (2013.01); *H04W 72/121* (2013.01); *H04W 72/1289* (2013.01); *H04W 84/042* (2013.01)

(56) References Cited

U.S. PATENT DOCUMENTS

| | | |
|---|---|---|
| 2016/0119046 A1 | 4/2016 | Trainin et al. |
| 2016/0165635 A1 | 6/2016 | Trainin et al. |
| 2016/0227455 A1* | 8/2016 | Lei ........................ H04W 36/08 |
| 2016/0352644 A1 | 12/2016 | Trainin et al. |
| 2016/0374053 A1 | 12/2016 | Hareuveni et al. |
| 2017/0034838 A1 | 2/2017 | Trainin et al. |
| 2018/0199359 A1* | 7/2018 | Cao ..................... H04W 74/006 |
| 2018/0227944 A1* | 8/2018 | Yerramalli ................ H04L 1/08 |
| 2018/0278403 A1* | 9/2018 | Yerramalli ............ H04L 5/0092 |

OTHER PUBLICATIONS

International Search Report and Written Opinion—PCT/US2018/015761—ISA/EPO—dated Jul. 4, 2018.

* cited by examiner

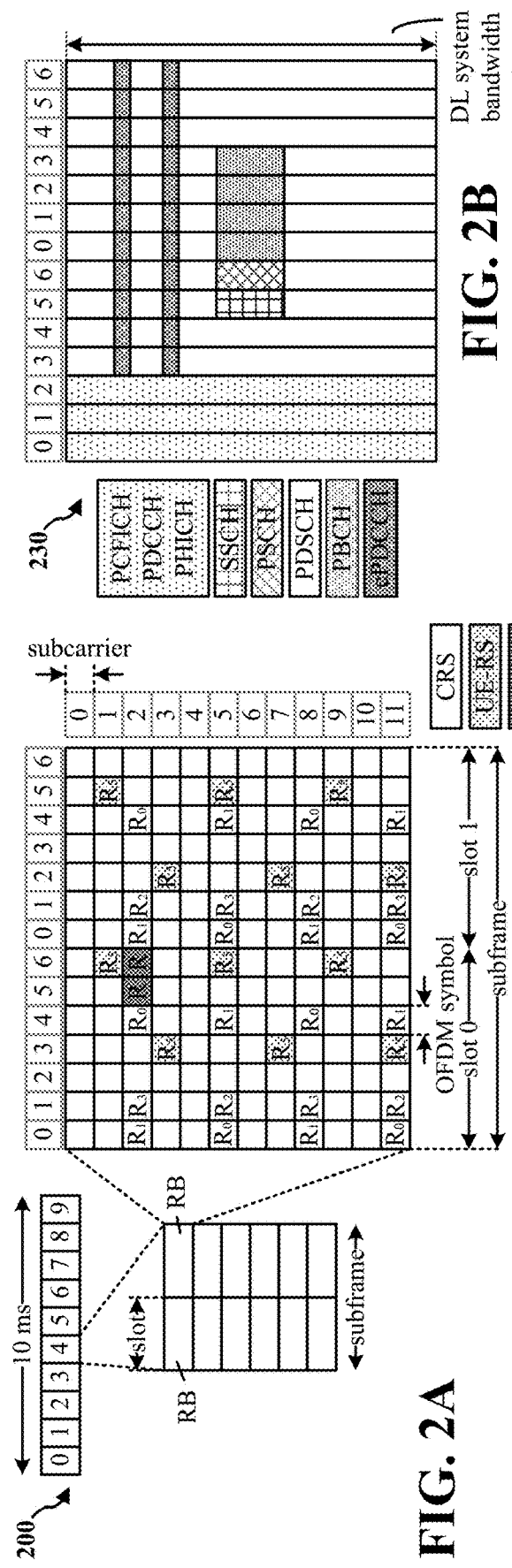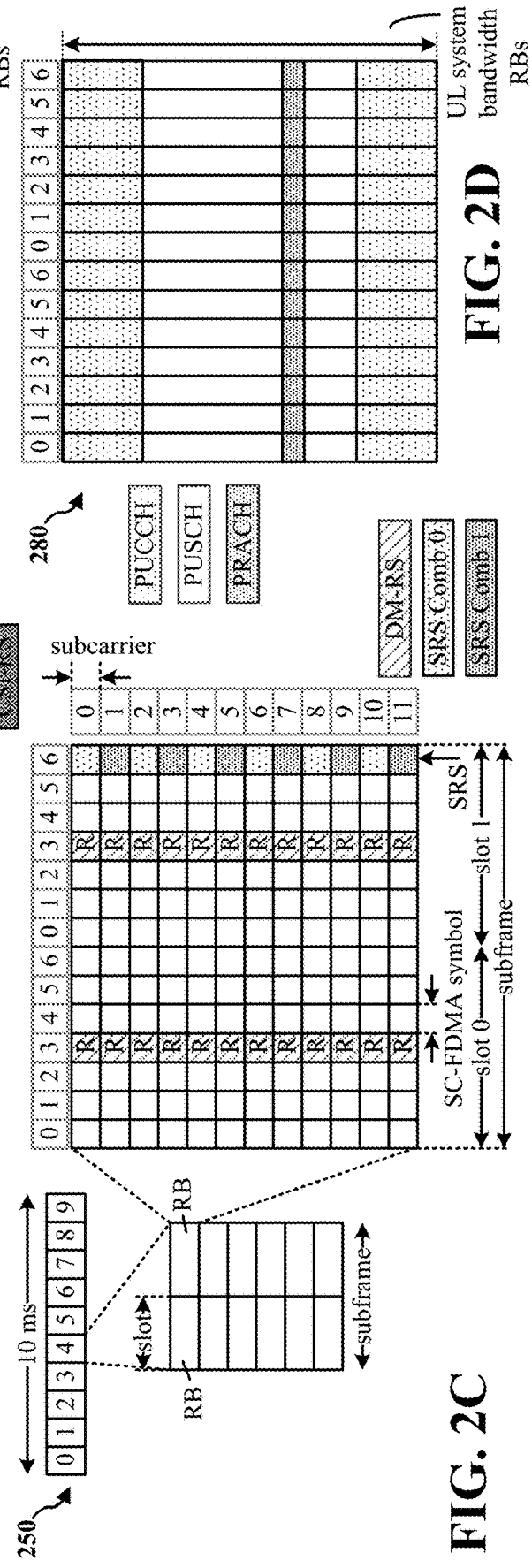

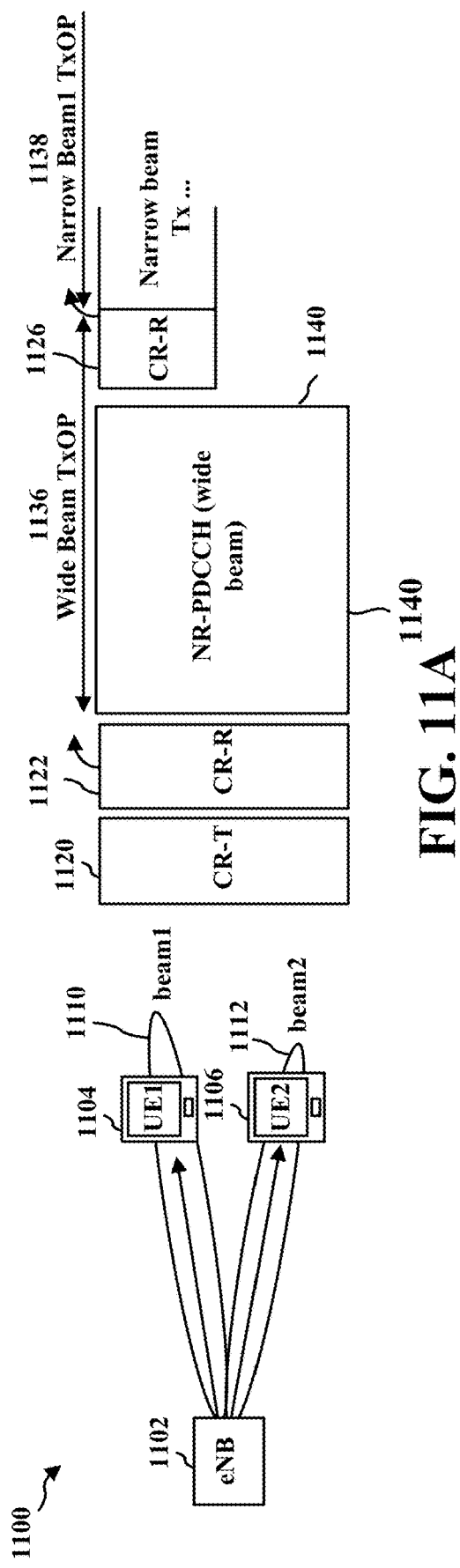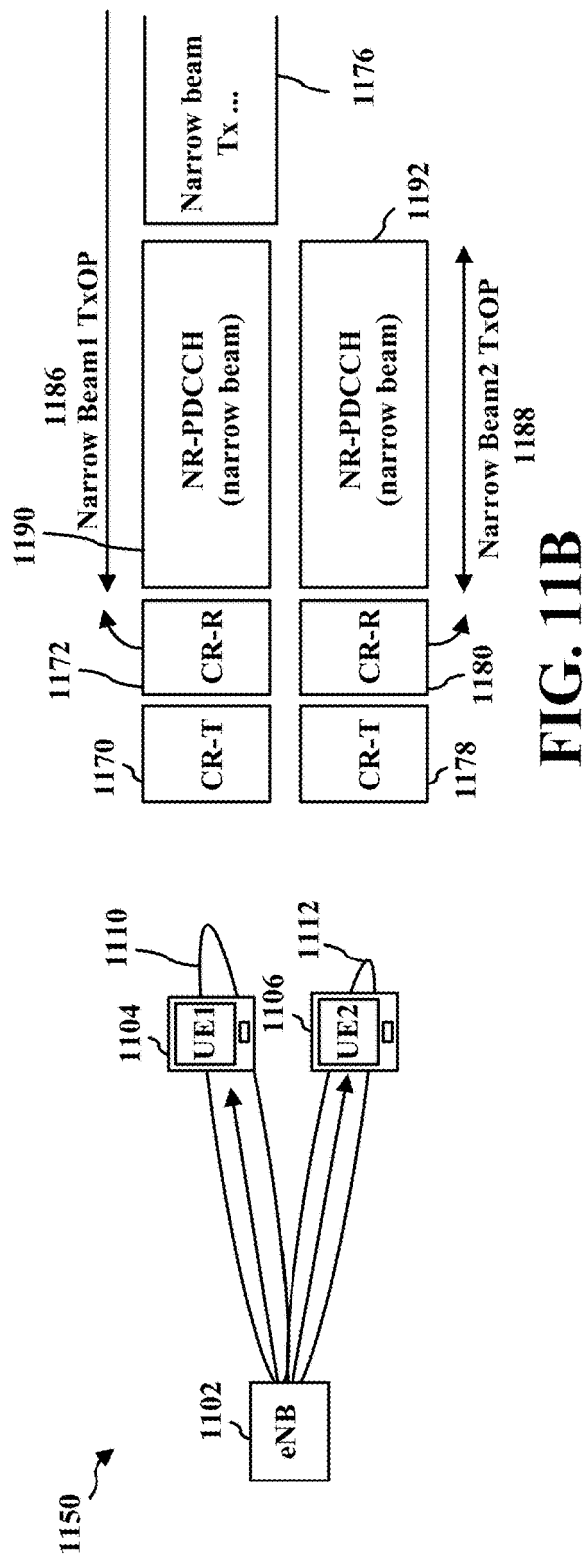
FIG. 11A
FIG. 11B

TECHNIQUE FOR HARQ, MULTIPLEXING, AND CONTENTION

CROSS-REFERENCE TO RELATED APPLICATION

This application claims the benefit of U.S. Provisional Application Ser. No. 62/464,329, entitled "TECHNIQUE FOR HARQ, MULTIPLEXING, AND CONTENTION IN MMW" and filed on Feb. 27, 2017, which is expressly incorporated by reference herein in its entirety.

BACKGROUND

Field

The present disclosure relates generally to communication systems, and more particularly, to millimeter wave (mmW) communication systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Channel sharing is a topic considered in many technologies (e.g. Wi-Fi, MulteFire). In mmW communication systems, multiple cellular operators may coexist in the same channel. Base stations may be expected to avail themselves of the multiple spatial dimensions in scheduling user equipments (UEs). With the benefits of adding a new dimension comes challenges about maintaining orthogonality across directions. When scheduling multiple UEs, a base station may risk over-reserving channels, if the multiple UEs are in different spatial directions. Some UE implementations may not be able to sustain self-contained transmission and reception in the same transmit opportunity (TxOP). In a mmW environment, cross-TxOP transmission may also need to handle beam changes. Furthermore, upon switching between beams, e.g., to a particular beam direction, a base station may not be sure whether there is an ongoing transmission that impacts that beam direction. This may be a problem in mmW systems, because the base station may not be able to sense multiple beams simultaneously.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a mmW communication system, self-contained TxOPs may not be possible for uplink (UL) grants. The mmW allocation of UL resources may be inflexible for cross-TxOP grants. To address this issue, in one aspect, a signal may be transmitted to trigger an UL transmission in a TxOP based on a grant from a previous TxOP.

In an aspect of the disclosure, a method, a computer-readable medium, and an apparatus for wireless communication are provided. The apparatus may be a base station. The apparatus may transmit an uplink grant to a UE during a first transmit opportunity. The apparatus may signal, during a second transmit opportunity, a grant trigger to the UE to trigger operations associated with the uplink grant that are uncompleted after the first transmit opportunity. The grant trigger may be associated with a set of UEs that includes the UE. The set of UEs may be a subset of the UEs having pending transmissions. The apparatus may instruct the UE regarding whether to keep or discard resources granted by the uplink grant when the UE switches to a different beam during or prior to the second transmit opportunity.

In another aspect, a method, a computer-readable medium, and an apparatus for wireless communication are provided. The apparatus may be a UE. The UE may receive an uplink grant from a base station during a first transmit opportunity. The UE may receive a grant trigger from the base station during a second transmit opportunity. The grant trigger may be associated with a set of UEs. The UE may perform operations associated with the uplink grant that are uncompleted after the first transmit opportunity when the set of UEs includes the UE.

When scheduling multiple UEs in a mmW communication system, the saving gained from new radio physical downlink control channel (NR-PDCCH) signaling may come at the expense of channel over-reservation. To address this issue, a channel reservation procedure and signaling may be used to allow a base station to trade-off between the efficient use of NR-PDCCH signaling and the need to avoid over-reservation.

In an aspect of the disclosure, a method, a computer-readable medium, and an apparatus for wireless communication are provided. The apparatus may be a base station. The apparatus may simultaneously schedule a first UE in a first beam and a second UE in a second beam. The apparatus may receive, from the first UE, a first channel reservation response for a first set of resources in the first beam during a first transmit opportunity. The apparatus may receive, from the second UE, a second channel reservation response for a second set of resources in the second beam during a second transmit opportunity.

The apparatus may transmit, to the first UE, a first data using the first set of resources in the first beam during the first transmit opportunity. The apparatus may transmit, to the second UE, a second data using the second set of resources in the second beam during the second transmit opportunity. The apparatus may receive a first uplink control channel in the first beam from the first UE. The apparatus may receive a second uplink control channel in the second beam from the second UE. The first uplink control channel and the second uplink control channel may be multiplexed on the same transmission interval (e.g., symbol) during the second transmit opportunity.

In a mmW communication system, self-contained TxOPs may not be assumed for uplink grants. The mapping from downlink (DL) transmission to UL acknowledgement (ACK)/negative ACK (NACK) may be inflexible for cross-TxOP ACK/NACK. To address this issue, in one aspect, flexible control feedback from multiple UEs across TxOPs may be used to reduce overhead.

In an aspect of the disclosure, a method, a computer-readable medium, and an apparatus for wireless communication are provided. The apparatus may be a base station. The apparatus may transmit a first data to a first UE in a first beam during a first transmit opportunity. The apparatus may transmit a second data to a second UE in a second beam during the first transmit opportunity. The apparatus may signal, during a second transmit opportunity, a trigger to the first UE and the second UE to trigger uplink control information associated with the first data and the second data. The trigger may be associated with a set of UEs that include the first UE and the second UE.

In another aspect of the disclosure, a method, a computer-readable medium, and an apparatus for wireless communication are provided. The apparatus may be a base station. The apparatus may transmit, at a first time instance, a message to a UE in a first beam to indicate that the base station will attempt channel reservation in the first beam at a second time instance. The apparatus may attempt the channel reservation in the first beam at the second time instance.

In one aspect, the apparatus may receive a message from the UE to approve transmission to the UE at the second time instance. In another aspect, the apparatus may receive a message from a second UE to impact (e.g., reject or postpone) transmission to the UE at the second time instance. In yet another aspect, a second UE may, at the second time instance, back off or otherwise refrain from reserving the first beam in a way that overlaps with the channel reservation of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 11A is a diagram illustrating an example of mmW multi-UE scheduling with wide beam DL contention process and DL control.

FIG. 11B is a diagram illustrating an example of mmW multi-UE scheduling with narrow beam DL contention process and DL control.

DETAILED DESCRIPTION

Figure 1:
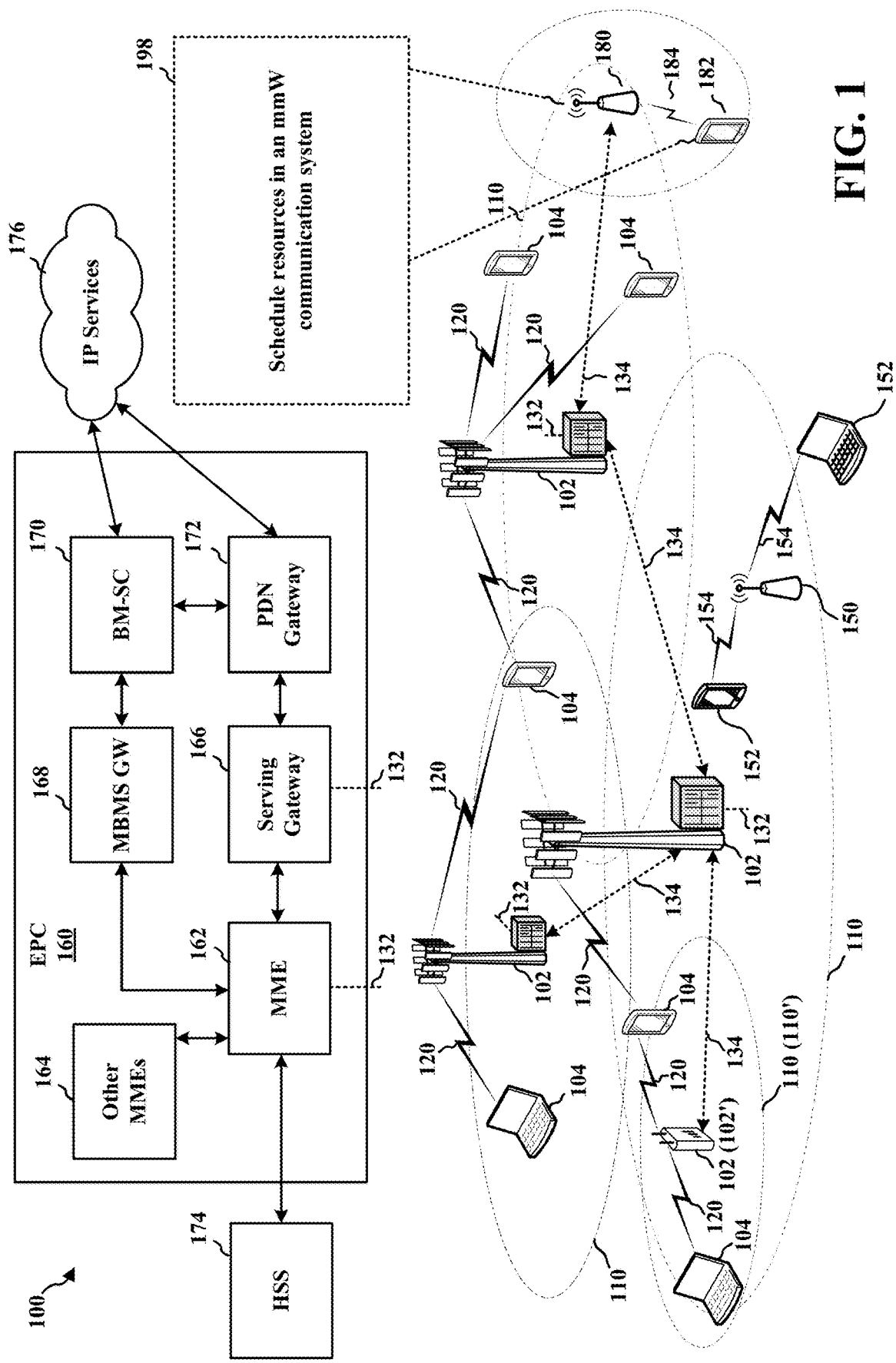
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 182/eNB 180 may be configured to schedule (198) resources in a mmW communication system, including, e.g., any of cross-TxOP scheduling, a grant trigger, reducing overhead for multiple UE scheduling, ACK/NACK signaling, signaling to address blindness, etc. Details of the operations performed at 198 will be further described below with reference to FIGS. 2-20.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
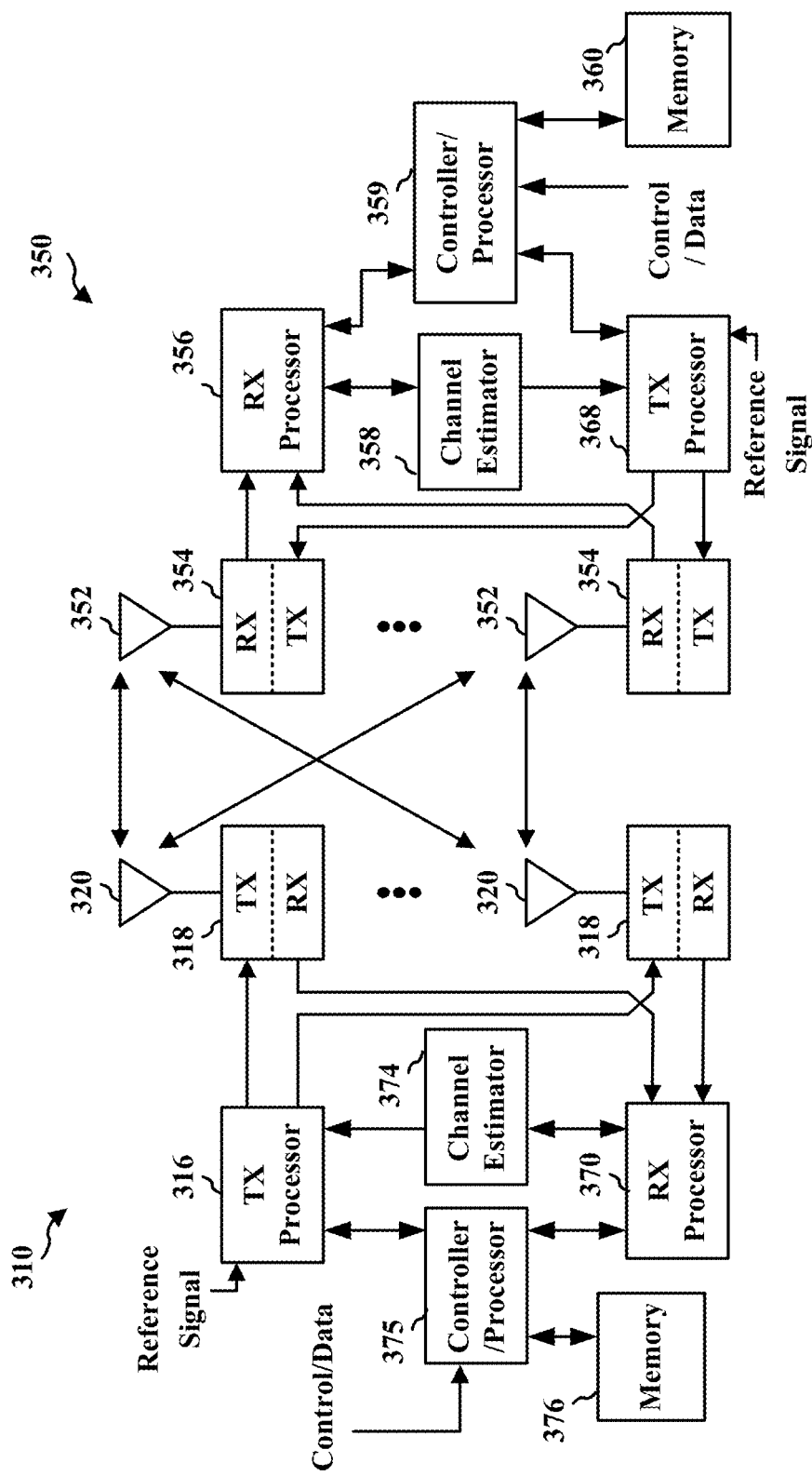
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
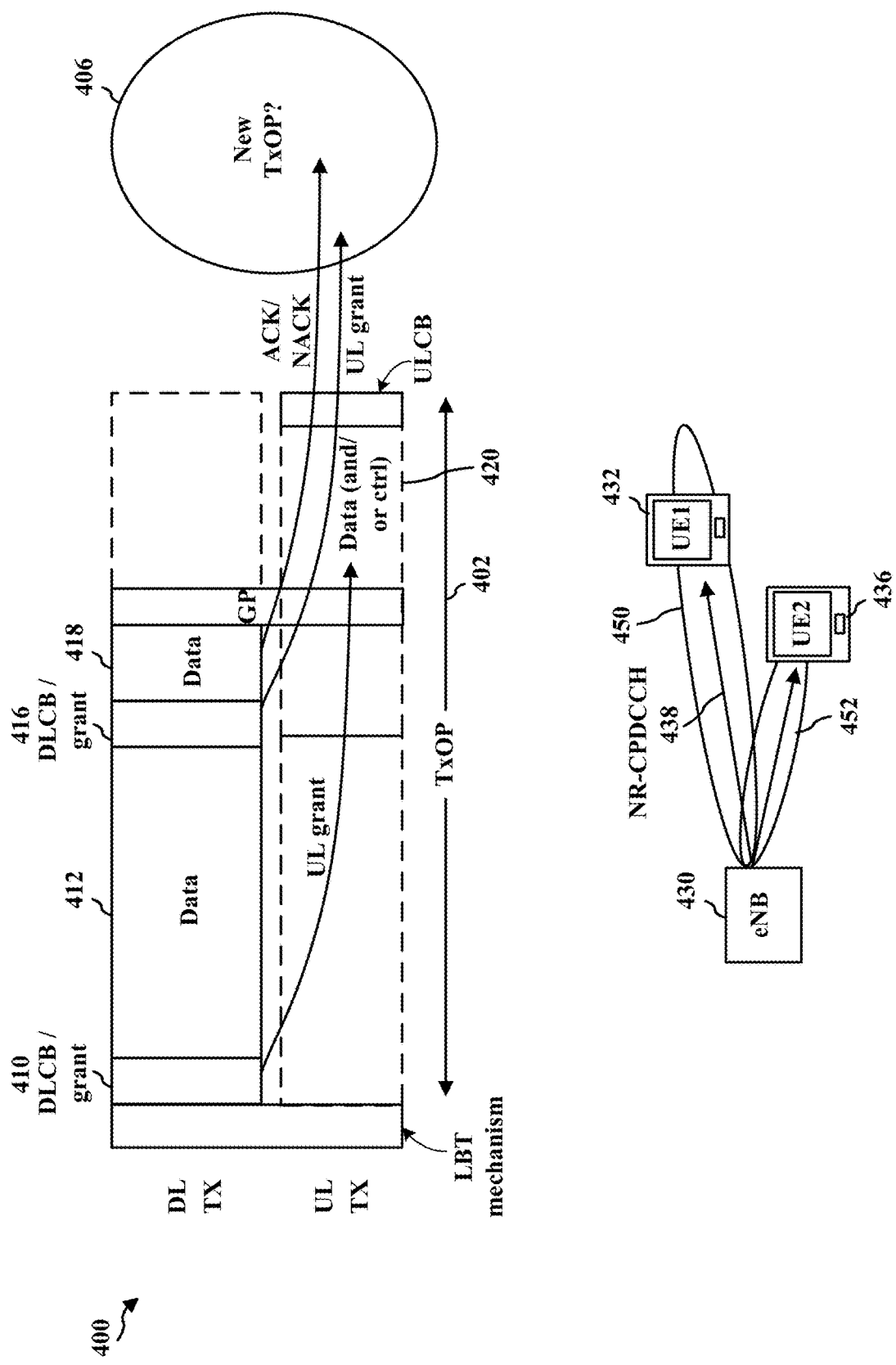
FIG. 4 is a diagram illustrating an example of the issues for cross-TxOP UL scheduling in a mmW communication system.

In a mmW communication system, UL control channel (e.g., PUSCH) may not be able to be transmitted in the same TxOP as a DL transmission due to the limit on TxOP length and the delay in processing DL transmissions. FIG. 4 is a diagram 400 illustrating an example of the issues for cross-TxOP UL scheduling in a mmW communication system. In this example, an eNB (e.g., 430) may send a UL grant 410 to a UE (e.g., 432), followed by DL data 412, UL grant 416, and DL data 418 during a TxOP 402. In response to the UL grant 410, the UE may transmit UL data/control 420, which may exhaust all remaining resources in the TxOP 402. As a result, the UL transmission authorized by the UL grant 416 and the acknowledgment to the DL data 418 may remain pending at the end of TxOP 402 and need to be transmitted in a new TxOP 406 that follows the TxOP 402. This issue may be referred to as a cross-TxOP UL scheduling issue.

The time delay from DL transmission to UL acknowledgment may be referred to as K1. The time delay from UL grant to corresponding UL transmission may be referred to as K2. The relevance of cross-TxOP UL scheduling issue may be a function of the values of K1 and K2. The lower the values of K1 and K2 are, the lower the likelihood of the cross-TxOP UL scheduling issue.

In one configuration, to address the cross TxOP UL scheduling issue, the eNB 430 may transmit a grant trigger 438 (e.g., via new radio common PDCCH (NR-CPDCCH)) that is not beam-aware to the UE 432 to trigger pending operations corresponding to a UL grant (e.g., the UL grant 416) in a new TxOP (e.g., the TxOP 406). The UE may refrain from transmitting data in a current TxOP based on an UL grant from a previous TxOP until the grant trigger is received in the current TxOP. The UE 432 may operate in beam 450 and a UE 436 may operate in an adjacent beam 452. If the grant trigger 438 is not UE-specific, the UE 436 in adjacent beam 452 may overhear the grant trigger 438 not meant for the UE 436, and apply UL grants to which eNB 430 may not respond. Furthermore, between the TxOPs 402 and 406, the beam in which the transmissions are served may change in a mmW communication system.

In one configuration, a grant trigger may contain a spatial grouping to associate the grant trigger (e.g., in NR-CPDCCH) with beams (implicitly or explicitly). For example, the grant trigger may contain a beam ID, and UL grants may be triggered for UEs in that beam identified in the grant trigger. In another example, spatial grouping may be handled as part of the contention resolution process. In one example, the spatial grouping may be signaled explicitly in NR-CPDCCH and/or the beam ID may be signaled in NR-PDCCH. In another example, the spatial grouping may be signaled implicitly. For example, when a UE detects a downlink transmission in its beam, the UE may use the granted UL resources for an UL transmission in a TxOP, where the UL transmission is based on a grant in a previous TxOP. The beam direction may be deduced, e.g., from contention signaling.

Figure 5:
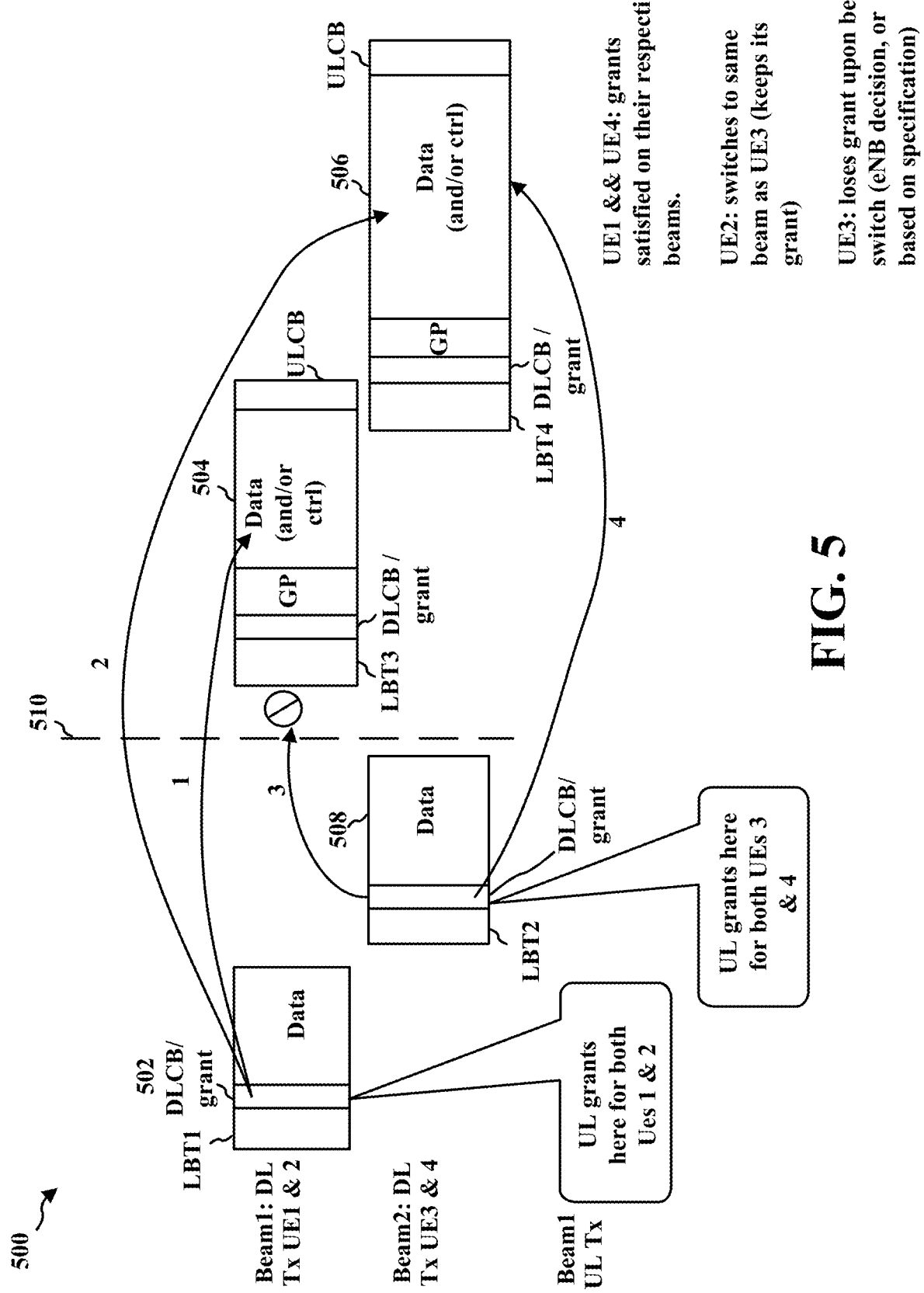
FIG. 5 is a diagram illustrating an example of grants interaction with beam tracking.

The eNB may determine whether UL grants survive when beams change. For example, the eNB may determine that grants may always or may never survive a beam change, or the eNB may signal to a tracked UE whether to keep or discard granted UL resources. Thus, the configuration may be determined by the eNB and signaled to the UE. FIG. 5 is a diagram 500 illustrating an example of grant interaction with beam tracking. In this example, an eNB may transmit UL grants 502 for both UEs 1 and 2 in beam 1, and UL grants 508 for both UEs 3 and 4 in beam 2. After time 510, the UE 2 may switch to beam 2 and the UE 3 may switch to beam 1. The eNB may decide whether the UE 2 may keep its grant and/or the UE 3 may lose grant upon beam switch. In another example, whether the UE 2 may keep its grant and may transmit data at 506 even though UE 2 switched to beam 2. In contrast, the UE 3 may lose grant upon beam switch may be based on a set of pre-determined criteria or operating procedure. Thus, UE 3 may be unable to transmit data at 504 on beam 1 due to the beam switch from beam 2.

In one configuration, a beam-direction specific trigger for data or control may be provided. An UL trigger may be similar to a common downlink control channel (CPDCCH) with additional signaling to clarify which UEs should follow the trigger. The signaling may comprise any of a bitmap, beam ID, a grouping that the eNB assigns on a spatial basis, etc. The trigger may also address how UL grants are handled across beams (e.g., transferred, handled at beam tracking time, or cancelled).

Figure 6:
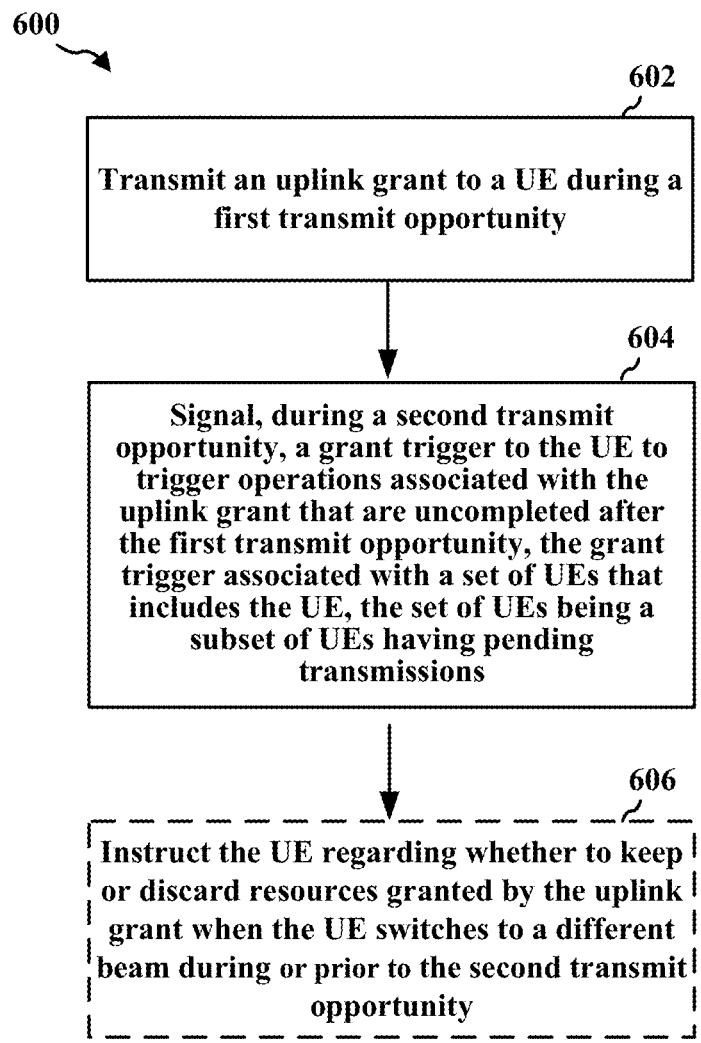
FIG. 6 is a flowchart of a method of wireless communication.

FIG. 6 is a flowchart 600 of a method of wireless communication. The method may be performed by an eNB (e.g., the eNB 180, 310, 430, or the apparatus 1902/1902'). The blocks illustrated with dashed lines may be optional steps of the method. At block 602, the eNB may transmit an uplink grant to a UE during a first transmit opportunity. The uplink grant may assign certain resources to the UE for uplink transmission.

At block 604, the eNB may signal, during a second transmit opportunity, a grant trigger to the UE to trigger operations associated with the uplink grant that are uncomplete after the first transmit opportunity. The grant trigger may be associated with a set of UEs that includes the UE. The set of UEs may be a subset of the UEs having pending transmissions. The second transmit opportunity may follow the first transmit opportunity.

The grant trigger may include an identifier of a beam used by the UE. The identifier of the beam may indicate that the grant trigger is associated with the set of UEs. The grant trigger may include a bitmap or a grouping that maps to the set of UEs. The set of UEs may have common spatial characteristics and include the UE. In one example, the grant trigger may be transmitted via NR-CPDCCH.

At block 606, the eNB may optionally instruct the UE regarding whether to keep or discard resources granted by the uplink grant when the UE switches to a different beam during or prior to the second transmit opportunity. In one configuration, if there is no beam switch, the UE may keep the resources granted by an uplink grant received in a previous TxOP. In one configuration, the eNB may decide whether the UE may keep or discard its grant upon beam switch. In another configuration, whether the UE may keep or discard its grant upon beam switch may be based on set of pre-determined criteria or operating procedure.

Figure 7:
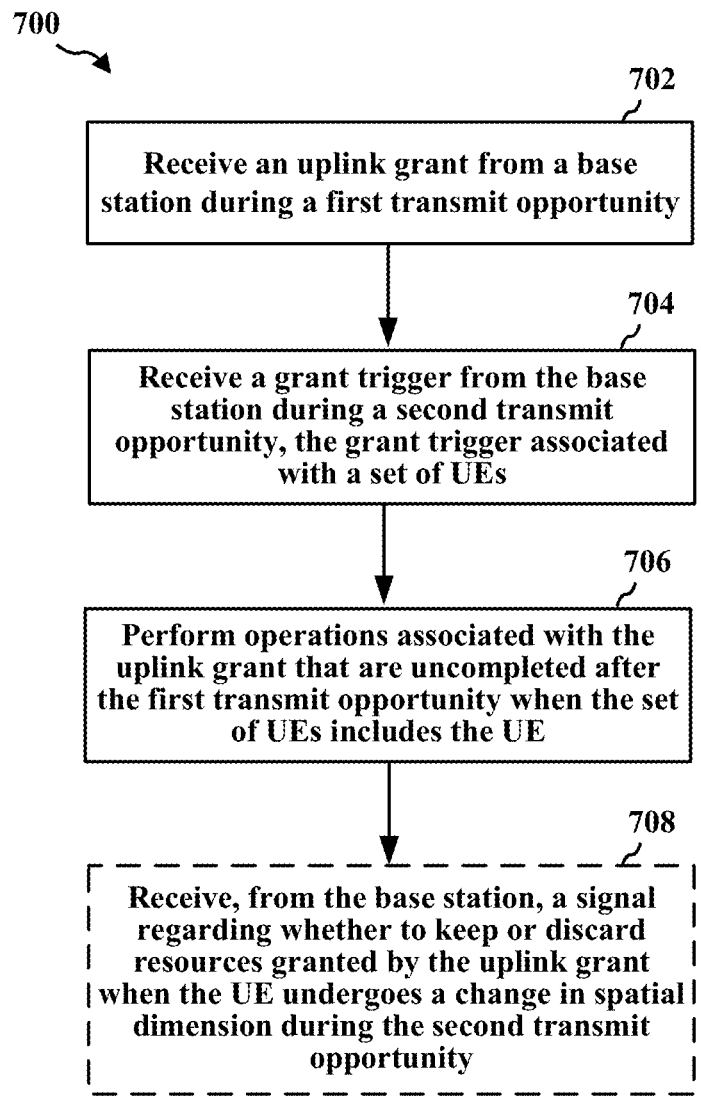
FIG. 7 is a flowchart of a method of wireless communication.

FIG. 7 is a flowchart 700 of a method of wireless communication. The method may be performed by a UE (e.g., the UE 182, 350, 432, or 1950). The blocks illustrated with dashed lines may be optional steps of the method. At block 702, the UE may receive an uplink grant from a base station during a first transmit opportunity. The uplink grant may assign certain resources to the UE for uplink transmission.

At block 704, the UE may receive a grant trigger from the base station during a second transmit opportunity. The grant trigger may be associated with a set of UEs. The second transmit opportunity may follow the first transmit opportunity. The set of UEs may have common spatial characteristics. In one configuration, the grant trigger may be received via NR-CPDCCH.

At block 706, the UE may perform operations associated with the uplink grant that are uncompleted after the first transmit opportunity when the set of UEs includes the UE. For example, granted data transmission may not be finished after the first transmit opportunity. In one configuration, the set of UEs may include the UE when the grant trigger includes an identifier of a beam used by the UE. In one configuration, the set of UEs may include the UE when the grant trigger includes a bitmap or a grouping that maps to the UE.

At block 708, the UE may optionally receive, from the base station, a signal regarding whether to keep or discard resources granted by the uplink grant when the UE undergoes a change in spatial dimension prior to or during the second transmit opportunity. In one configuration, the base station may decide whether the UE may keep or discard its grant upon beam switch. In another configuration, whether the UE may keep or discard its grant upon beam switch is based on set of pre-determined criteria or operating procedure.

In one configuration, the overhead for multi-UE scheduling may be reduced in a mmW communication system. An eNB may have multiple ways to schedule UEs in different narrow beams. In one configuration, time division multiplexing (TDM) contention may be used in each narrow beam, each of which may have its own preamble. In such a configuration, DL control may have multiple contention and control overhead.

Figure 8:
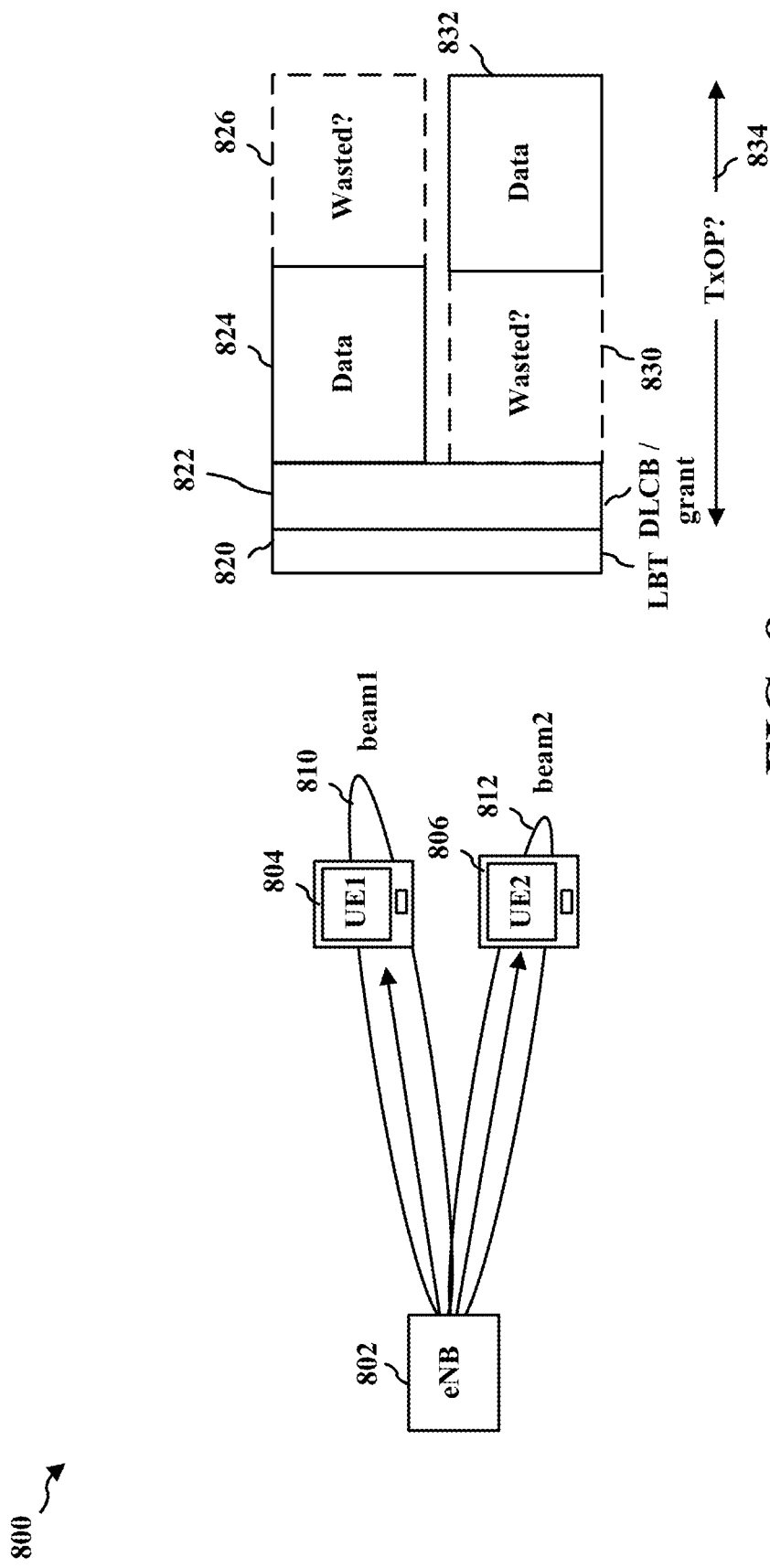
FIG. 8 is a diagram illustrating an example of mmW multi-UE scheduling that saves on multiple DL control and contention by contending in a wider beam for DL control, and multiplexing UE control on a single DL control symbol.

FIG. 8 is a diagram 800 illustrating an example of mmW multi-UE scheduling that saves on multiple DL control and contention by contending in a wider beam for DL control, and multiplexing UE control on a single DL control symbol. In this example, an eNB 802 may try to schedule UEs 804 and 806. The eNB 802 may communicate with the UE 804 on beam 810, and the eNB 802 may communicate with the UE 806 on beam 812. The wider beam may cover both the beam 810 and the beam 812.

In one configuration, the eNB 802 may transmit a contention block 820 on the wider beam, followed by DL control 822 on the wider beam. The eNB 802 may then transmit data 824 on the beam 810 and data 832 on the beam 812. The data 824 and data 832 may not overlap in time to avoid interferences between the beams 810 and 812.

The eNB 802 may save on overhead by sharing the control in DL control 822, as well as possibly sharing the contention process in the contention block 820. In one configuration, the eNB 802 may need to trade off among contention overhead, contention success rate, and implementation complexity. However, the saving on DL control may come at the expense of over-reserving channel because reserving a contiguous TxOP 834 to cover both control and data in the wider beam can be wasteful. For example, resource blocks 826 and 830 may be wasted.

In the example of FIG. 8, resource waste on DL is illustrated, though similar resource waste may also happen on the UL. In addition, the case of two different beams is illustrated in FIG. 8, but channel waste could also occur for two UEs that are power controlled in the same beam, with very different path losses.

Figure 9:
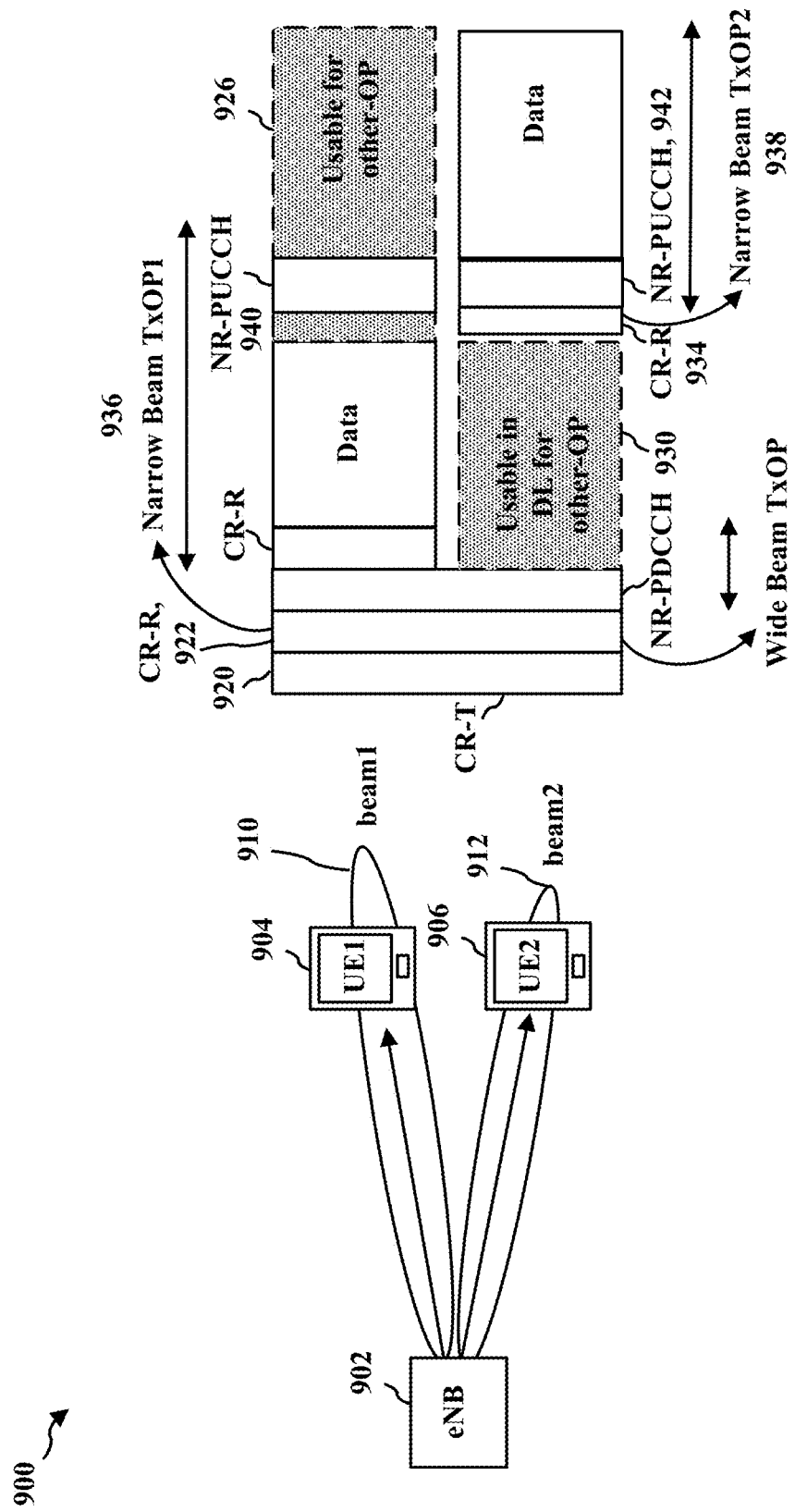
FIG. 9 is a diagram illustrating an example of mmW multi-UE scheduling with discontinuous TxOP signaling.

In one configuration, to reduce waste while simultaneously scheduling UEs in different beams, discontinuous TxOP signaling (e.g., in contention, or jointly with new radio (NR) control) may be allowed. FIG. 9 is a diagram 900 illustrating an example of mmW multi-UE scheduling with discontinuous TxOP signaling. In this example, an eNB 902 may try to schedule UEs 904 and 906. The eNB 902 may communicate with the UE 904 on beam 910, and the eNB 902 may communicate with the UE 906 on beam 912.

In one configuration, an opportunistic future TxOP approach may be adopted. In such a configuration, the eNB 902 may transmit a wide beam/multi-beam contention block 920 on a wider beam that includes both the beam 910 and the beam 912. The UE 904 may reserve the remaining TxOP 936 using a channel reservation response 922. The UE 906 may opportunistically reserve resources in TxOP 938 using a channel reservation response 934 (e.g., based on NR-PDCCH). However, the opportunity for UE 906 to reserve resources in TxOP 938 is not guaranteed.

In one configuration, the eNB 902 may receive from the UEs 904 and 906 in wide beam/multi-beam. In one configuration, UL control 940 (e.g., NR-PUCCH) of UE 904 and UL control 942 (e.g., NR-PUCCH) of UE 906 may be multiplexed on the same transmission interval (e.g., symbol). In one configuration, the UE 904 may have self-contained TxOP 936, and the UE 906 may have pending UL transmission (e.g., PUCCH). In one configuration, cross-TxOP triggering may be needed for the transmission of UL data and control for the UE 906. In the example of FIG. 9, because of the opportunistic future TxOP signaling, resource blocks 926 and 930 may be used by other wireless service operators, thus not wasted.

Figure 10:
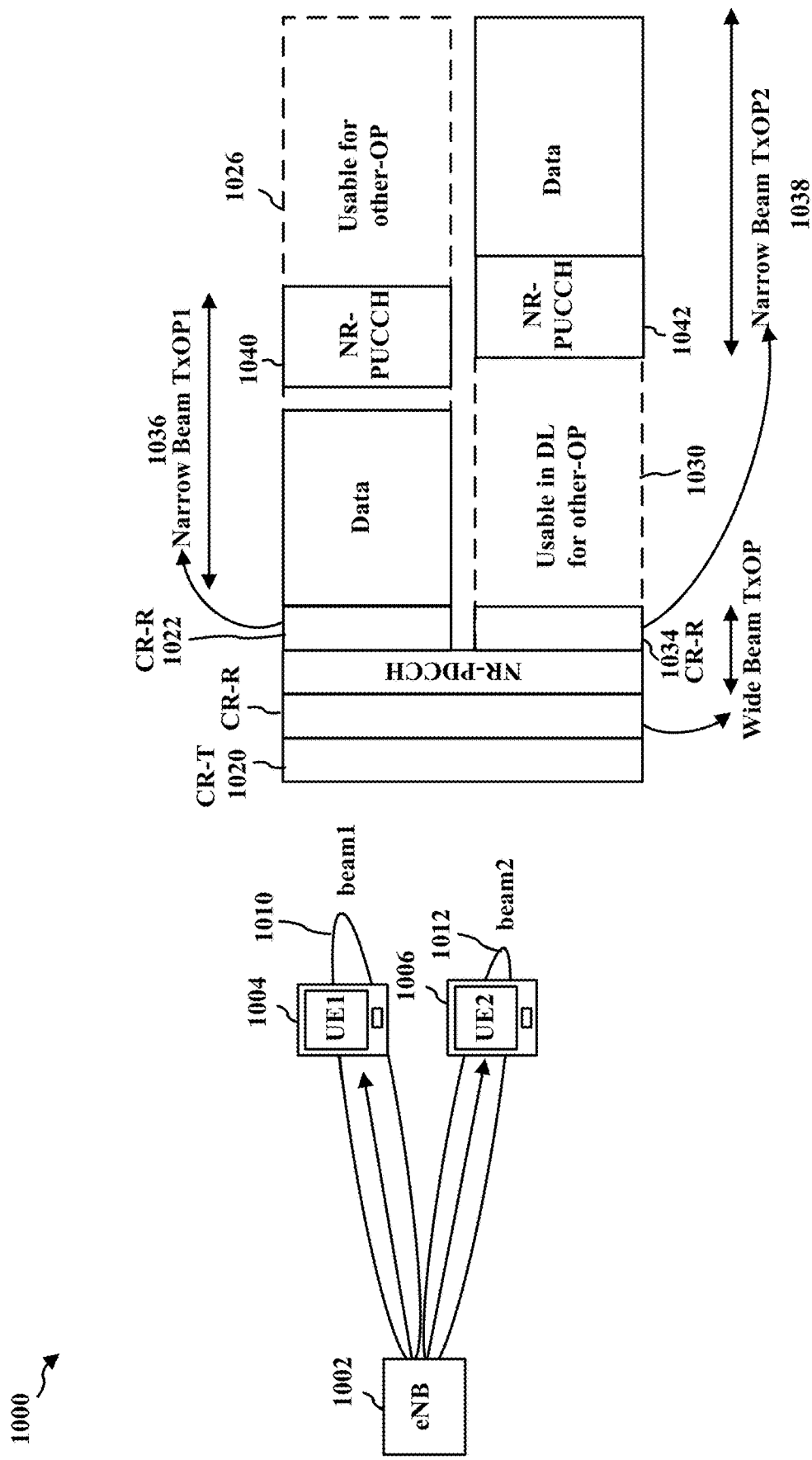
FIG. 10 is a diagram illustrating another example of mmW multi-UE scheduling with discontinuous TxOP signaling.

FIG. 10 is a diagram 1000 illustrating another example of mmW multi-UE scheduling with discontinuous TxOP signaling. In this example, an eNB 1002 may try to schedule UEs 1004 and 1006. The eNB 1002 may communicate with the UE 1004 on beam 1010, and the eNB 1002 may communicate with the UE 1006 on beam 1012.

In one configuration, a guaranteed future TxOP approach may be adopted. In such a configuration, the eNB 1002 may transmit a wide beam/multi-beam contention block 1020 on a wider beam that includes both the beam 1010 and the beam 1012. The UE 1004 may reserve the remaining TxOP 1036 using a channel reservation response 1022. The UE 1006 may reserve resources in TxOP 1038 using a discontinuous channel reservation response 1034.

In one configuration, the eNB 1002 may receive data or control information from the UEs 1004 and 1006 in wide beam/multi-beam. In one configuration, UL control 1040 (e.g., NR-PUCCH) of UE 1004 and UL control 1042 (e.g., NR-PUCCH) of UE 1006 may be multiplexed on the same transmission interval (e.g., symbol). In one configuration, the UE 1004 may have self-contained TxOP 1036, and the UE 1006 may have pending UL transmission (e.g., PUCCH). In one configuration, cross-TxOP triggering may be needed for the transmission of UL data and control for the UE 1006. In the example of FIG. 10, because of the guaranteed future TxOP signaling, resource blocks 1026 and 1030 may be used by other wireless service operators, thus not wasted.

In one configuration, NR-PUCCH from multiple UEs may be multiplexed on the same transmission interval (e.g., symbol). In one configuration, beam tracking occasions may be used to re-allocate orthogonal NR-PUCCH resources.

The DL contention process and DL control for multi-UE scheduling in a mmW communication system may use narrow beam or wide beam. FIG. 11A is a diagram 1100 illustrating an example of mmW multi-UE scheduling with wide beam DL contention process and DL control. In this example, an eNB 1102 may try to schedule UEs 1104 and 1106. The eNB 1102 may communicate with the UE 1104 on beam 1110, and the eNB 1102 may communicate with the UE 1106 on beam 1112.

In one configuration, the eNB 1102 may transmit a wide beam/multi-beam contention process (e.g., channel reservation transmission 1120) on a wider beam that includes both the beam 1110 and the beam 1112. The eNB 1102 may receive a wide beam channel reservation response 1122. The eNB 1102 may transmit a wide beam control block 1140 (e.g., NR-PDCCH) during a wide beam TxOP 1136. The UE 1106 may reserve resources in beam 1110 during TxOP 1138 using a narrow beam channel reservation response 1126.

In one configuration, a single RX/TX chain may be used for protecting NR-PDCCH when wide beam is used. However, the channel reservation transmission or response may need to support multi-link reservation.

FIG. 11B is a diagram 1150 illustrating an example of mmW multi-UE scheduling with narrow beam DL contention process and DL control. In this example, an eNB 1102 may try to schedule UEs 1104 and 1106. The eNB 1102 may communicate with the UE 1104 on beam 1110, and the eNB 1102 may communicate with the UE 1106 on beam 1112.

In one configuration, the eNB 1102 may transmit a narrow beam contention process (e.g., channel reservation transmission 1170) on the beam 1110, and a narrow beam contention process (e.g., channel reservation transmission 1178) on the beam 1112. The UE 1104 may reserve resources in the beam 1110 using a narrow beam channel reservation response 1172 and the UE 1106 may reserve resources in the beam 1112 using a narrow beam channel reservation response 1180. The eNB 1102 may transmit a narrow beam control block 1190 (e.g., NR-PDCCH) on the beam 1110 during a narrow beam TxOP 1186, and a narrow beam control block 1192 (e.g., NR-PDCCH) on the beam 1112 during a narrow beam TxOP 1188. Data block 1176 may be transmitted after the control block 1190.

In one configuration, by using narrow beam contention process, there may be higher chance of contention success, with short latency. Additionally, there may not be a need for any additional channel reservation response from the UE 1104 to reserve the beam 1110, e.g., to transmit data block 1176.

In one configuration, the eNB 1102 may reserve in a wider beam for control, narrow beams (e.g., the beams 1110 and 1112) for data. This may be combined with discontinuous TxOP operations, e.g. for UEs where control is not contiguous with data. In one configuration, control information in the wide beam may indicate channel reservation for multiple UEs in narrow beams. In one configuration, the eNB 1102 may determine whether to jointly signal UEs in the control region, or to signal control separately to each UE depending on the estimated likelihood of any of the channel being won, latency considerations, and/or previous observation of contention outcome.

Figure 12:
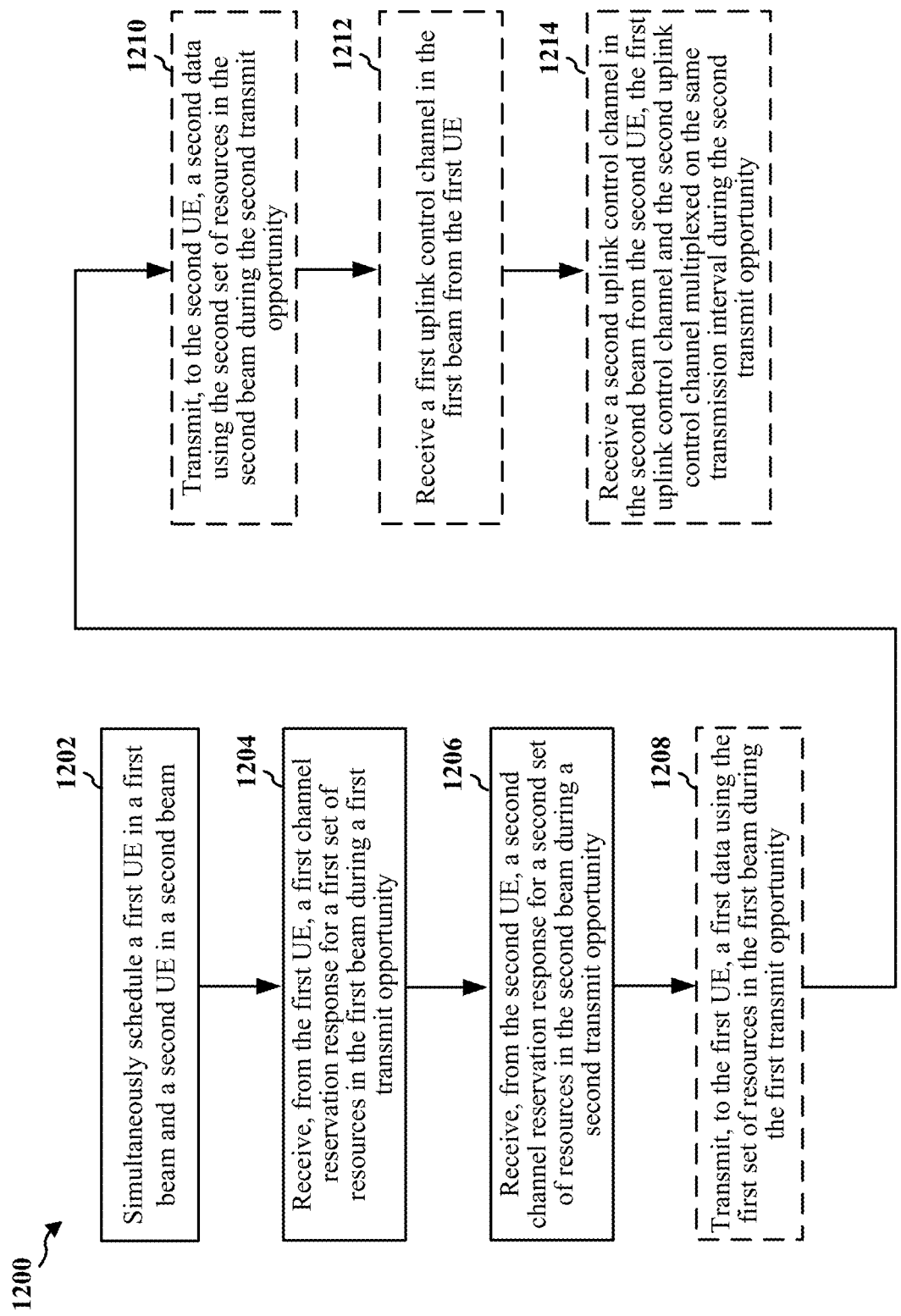
FIG. 12 is a flowchart of a method of wireless communication.

FIG. 12 is a flowchart 1200 of a method of wireless communication. The method may be performed by an eNB (e.g., the eNB 180, 310, 802, 902, 1002, 1102, or the apparatus 1902/1902'). The blocks illustrated with dashed lines may be optional steps of the method. At block 1202, the eNB may simultaneously schedule a first UE in a first beam and a second UE in a second beam. In one configuration, the scheduling may be performed using a third beam addressing both the first UE and the second UE, as described above in connection with FIG. 11A. In one configuration, the scheduling may be simultaneously performed in the first beam for the first UE and in the second beam for the second UE, as described above in connection with FIG. 11B.

At block 1204, the eNB may receive, from the first UE, a first channel reservation response for a first set of resources in the first beam during a first transmit opportunity. The first channel reservation response may reserve the first set of resources in the first beam for data transmission of the first UE over the first transmit opportunity.

At block 1206, the eNB may receive, from the second UE, a second channel reservation response for a second set of resources in the second beam during a second transmit opportunity. In one configuration, the second channel reservation response may be received at the second transmit opportunity. In one configuration, the second channel reservation response may be received at the first transmit opportunity. In one configuration, the second transmit opportunity may follow the first transmit opportunity.

At block 1208, the eNB may optionally transmit, to the first UE, a first data using the first set of resources in the first beam during the first transmit opportunity. The first data may be transmitted in the first beam using mmW technology.

At block 1210, the eNB may optionally transmit, to the second UE, a second data using the second set of resources in the second beam during the second transmit opportunity. The second data may be transmitted in the second beam using mmW technology.

At block 1212, the eNB may optionally receive a first uplink control channel in the first beam from the first UE. The first uplink control channel may include ACK/NACK to the first data.

At block 1214, the eNB may optionally receive a second uplink control channel in the second beam from the second UE. The first uplink control channel and the second uplink control channel may be multiplexed on the same transmission interval (e.g., symbol) during the second transmit opportunity. In one configuration, the second set of resources may be preceded by the second uplink control channel.

In one configuration, unambiguous ACK/NACK signaling may need to occur across TxOPs. For multiple UEs (in one or multiple beams) that received DL, pulling UL ACK/

NACK UCI from the multiple UEs may be a significant overhead. In one configuration, fixed (e.g., signaled or pre-determined) timing may be used between DL TX and UL acknowledgment.

Figure 13:
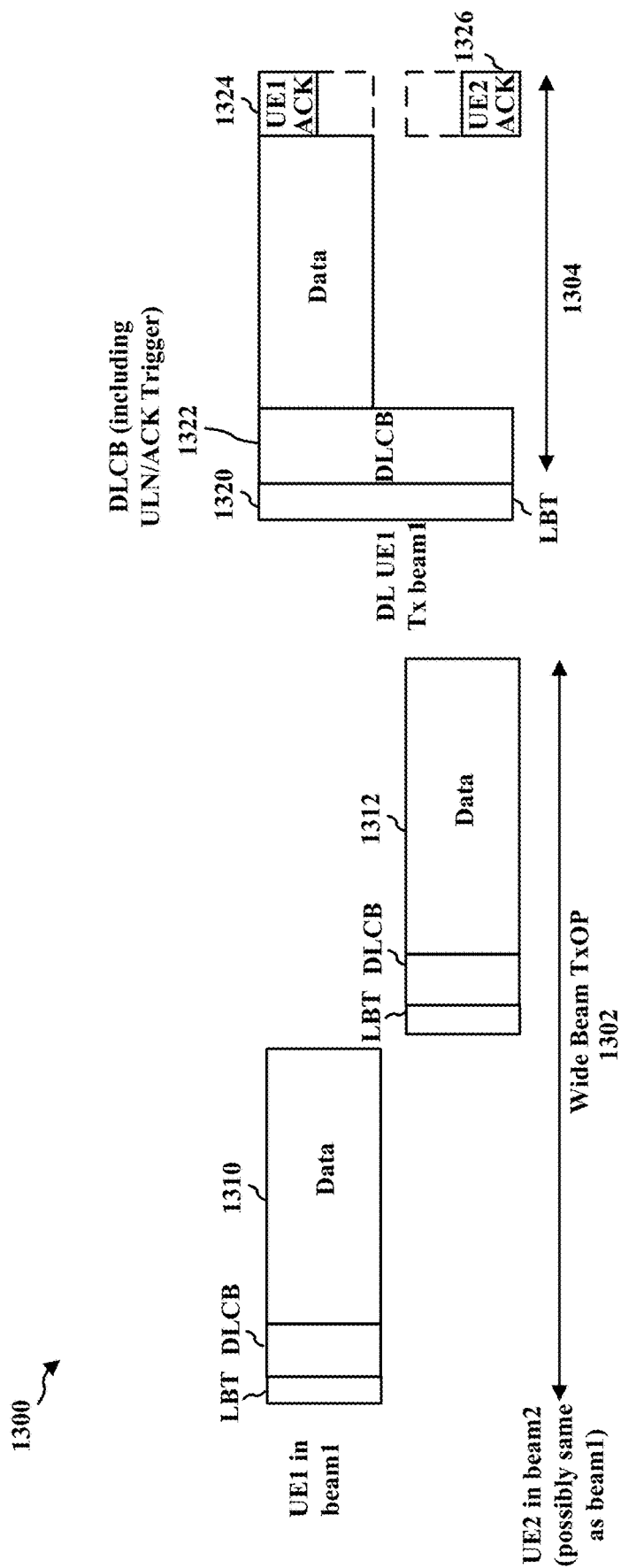
FIG. 13 is a diagram illustrating an example of mmW UL control aggregation from one or multiple UEs.

FIG. 13 is a diagram 1300 illustrating an example of mmW UL control aggregation from one or multiple UEs. In this example, an eNB may try to schedule UE 1 and UE 2. The eNB may communicate with the UE 1 on beam 1, and the eNB may communicate with the UE 2 on beam 2. In one configuration, beam 2 may be different from beam 1, or may be the same as beam 1. During TxOP 1302, the eNB may transmit data 1310 to UE 1 via beam 1 and data 1312 to UE 2 via beam 2.

At TxOP 1304, the eNB may transmit a wide beam contention block 1320 and a wide beam DL control block 1322. In one configuration, an UL ACK/NACK trigger may be included in the contention block 1320 or the DL control block 1322. In response to the UL ACK/NACK trigger, the UE 1 may transmit an ACK/NACK 1324 to acknowledge the data 1310 and the UE 2 may transmit an ACK/NACK 1326 to acknowledge the data 1312. The UE may refrain from transmitting an ACK/NACK until the UL ACK/NACK trigger is received.

In one configuration, the UL ACK/NACK trigger may include a UE grouping that specifies a set of UEs whose ACK/NACK may be triggered. In one configuration, the UE grouping for UL ACK/NACK trigger may be the same as the spatial grouping for UL grant trigger described above with reference to FIGS. 4-7. In one configuration, the UE grouping for UL ACK/NACK trigger may be different from the spatial grouping for UL grant trigger described above with reference to FIGS. 4-7.

In one configuration, the ACK/NACKs 1324 and 1326 may be scheduled in UL-specific control region (e.g., PUCCH in last symbol(s) of TxOP 1304). In one configuration, the ACK/NACKs 1324 and 1326 may have orthogonality in time, frequency, and/or code. In one configuration, contention resolution may allow simultaneous UL transmission, unless PUCCH from different UEs TDD-ed.

Figure 14:
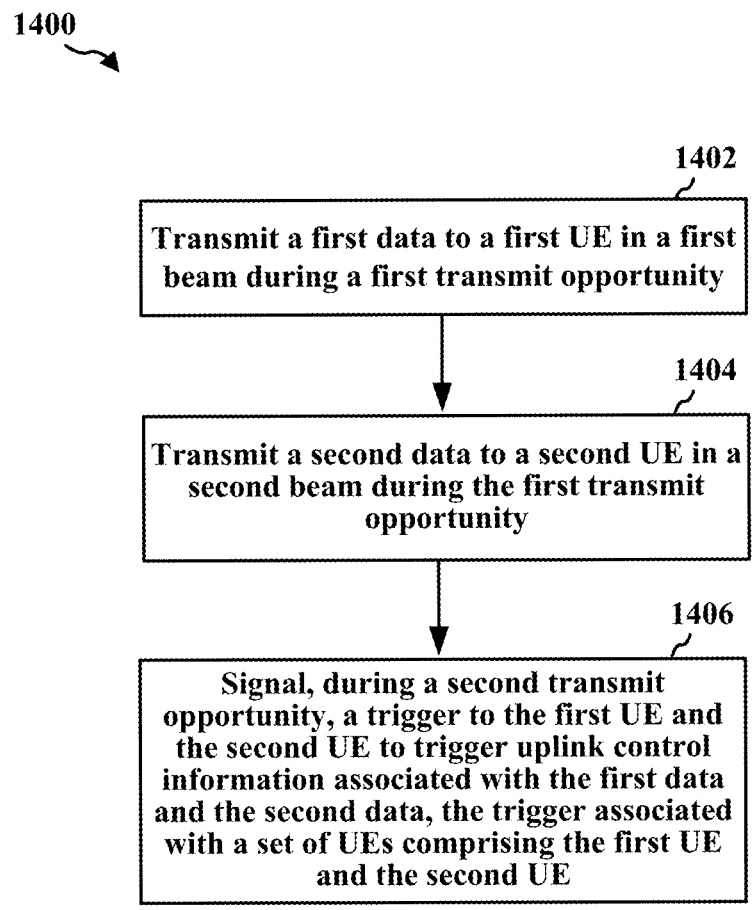
FIG. 14 is a flowchart of a method of wireless communication.

FIG. 14 is a flowchart 1400 of a method of wireless communication. The method may be performed by an eNB (e.g., the eNB 180, 310, or the apparatus 1902/1902'). At block 1402, the eNB may transmit a first data to a first UE in a first beam during a first transmit opportunity. The first data may be transmitted in the first beam using mmW technology.

At block 1404, the eNB may transmit a second data to a second UE in a second beam during the first transmit opportunity. The second data may be transmitted in the second beam using mmW technology.

At block 1406, the eNB may signal, during a second transmit opportunity, a trigger to the first UE and the second UE to trigger uplink control information associated with the first data and the second data, e.g., as described in connection with FIG. 13. The trigger may be associated with a set of UEs comprising the first UE and the second UE. The second transmit opportunity may follow the first transmit opportunity.

In one configuration, the trigger may associate with the set of UEs by including identifiers of the first beam and the second beam. In one configuration, the trigger may associate with the set of UEs by including a bitmap or a grouping that maps to the set of UEs. In one configuration, the trigger may be transmitted in a downlink control block of the second transmit opportunity in a third beam addressing both the first UE and the second UE.

In one configuration, the uplink control information associated with the first data and the second data may include a first acknowledgement or negative-acknowledgement to the first data and a second acknowledgement or negative-acknowledgement to the second data. In such a configuration, the first acknowledgement or negative-acknowledgement and the second acknowledgement or negative-acknowledgement may be transmitted in the same mini-slot within the second transmit opportunity.

Upon switching between beams to a particular direction, a base station may not be sure whether there is an ongoing transmission that impacts that direction. This issue may be referred to as blindness. Blindness is a mmW-specific problem, since the base station may not be able to sense multiple beams simultaneously. In one configuration, a contention mechanism may be used to partially address blindness. For example, at time T0, node A may send a signal a configurable time ahead, to notify nodes of future link setup with node B at time T1.

Figure 15:
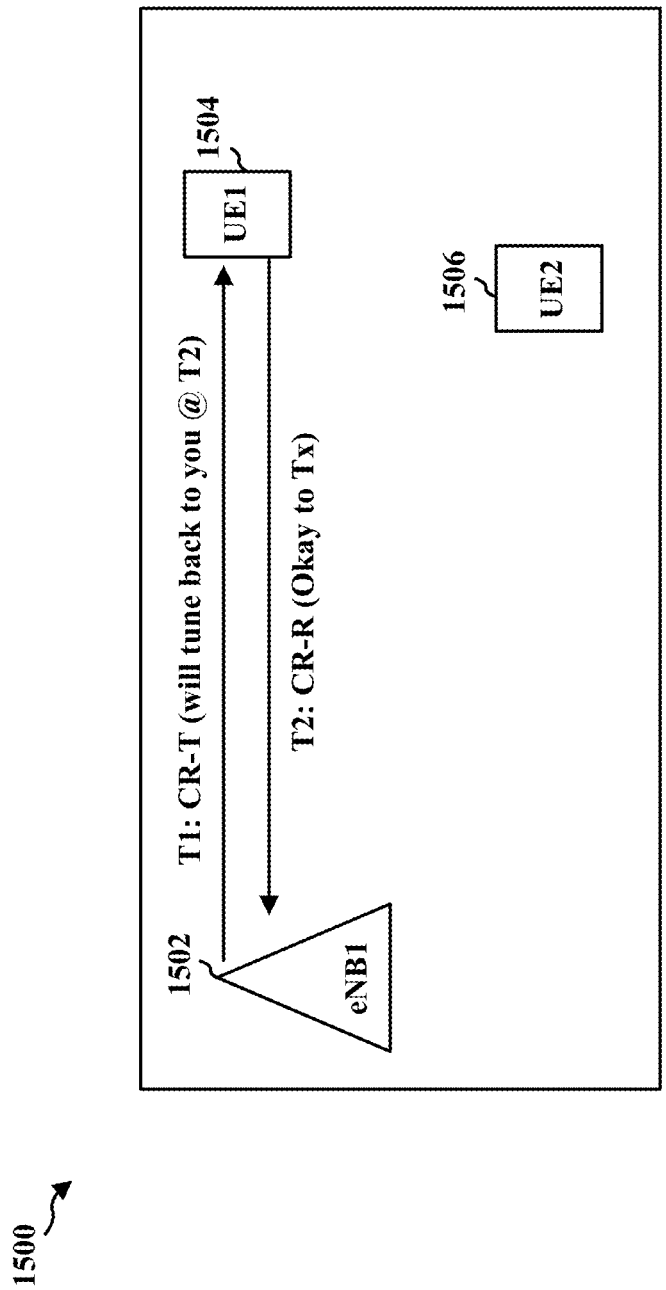
FIG. 15 is a diagram illustrating an example of a contention mechanism to address blindness.

FIG. 15 is a diagram 1500 illustrating an example of a contention mechanism to address blindness. In this example, an eNB 1502 may switch from a beam communicating with a UE 1504 to another beam communicating with another UE (e.g., UE 1506) at time T1. At time T1, the eNB 1502 may send a message (e.g., a channel reservation transmission) to the UE 1504 to inform the UE 1504 that the eNB 1502 will tune back to the UE 1504 at time T2. The UE 1504 may inform the eNB 1502 (e.g., via a channel reservation response) that its medium is clear for link at time T2. As a result, the eNB 1502 may be able to know that it can transmit to the UE 1504 at time T2.

Figure 16:
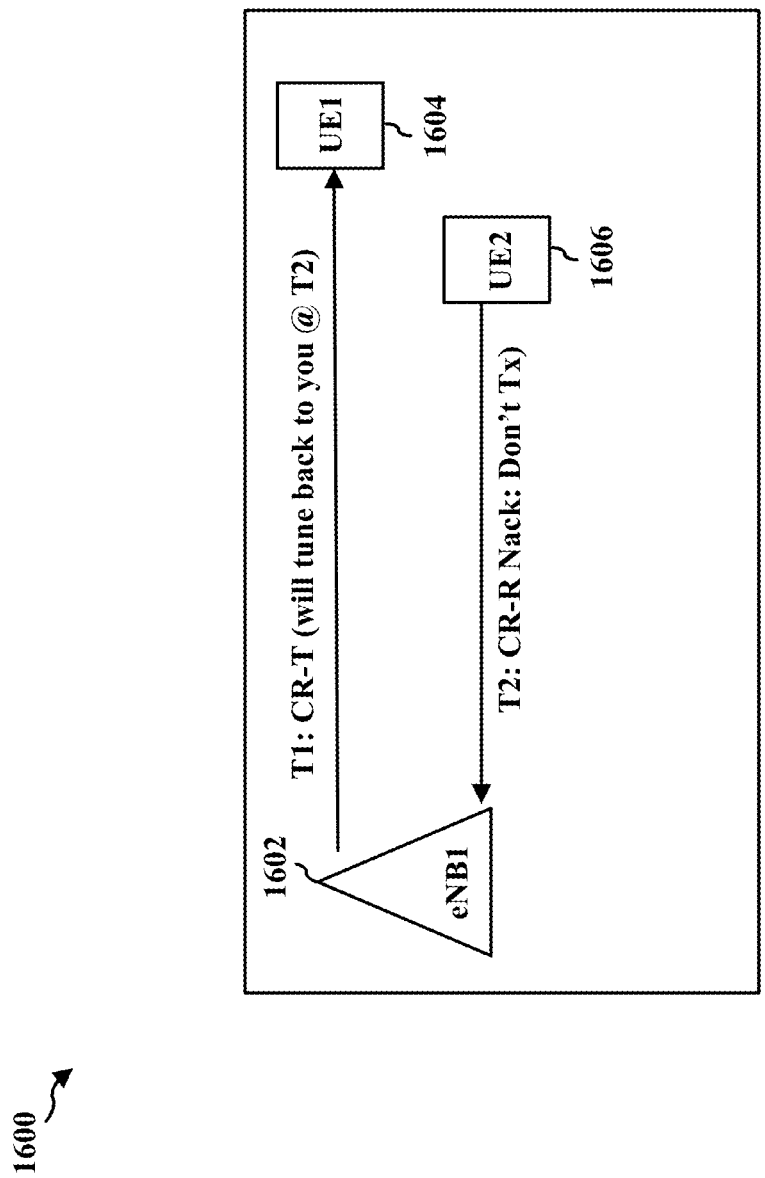
FIG. 16 is a diagram illustrating another example of a contention mechanism to address blindness.

FIG. 16 is a diagram 1600 illustrating another example of a contention mechanism to address blindness. In this example, an eNB 1602 may switch from a beam communicating with a UE 1604 to another beam communicating with another UE at time T1. At time T1, the eNB 1602 may send a message (e.g., a channel reservation transmission) to the UE 1604 to inform the UE 1604 that the eNB 1602 will tune back to the UE 1604 at time T2. At time T2, a UE 1606 may inform the eNB 1602 (e.g., via a channel reservation response) not to transmit to the UE 1604 at T2, e.g., due to the link being busy. As a result, the eNB 1602 may be able to know that it cannot transmit to the UE 1604 at time T2.

Figure 17:
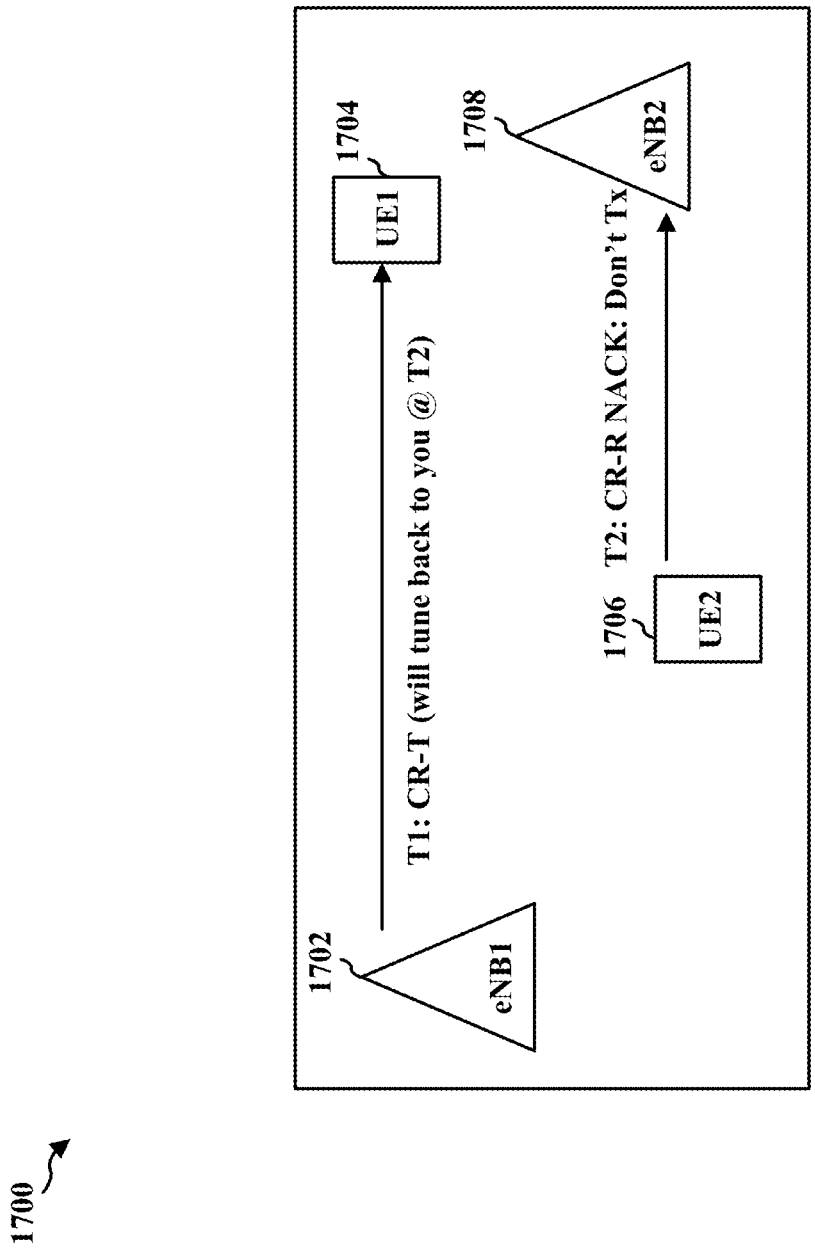
FIG. 17 is a diagram illustrating yet another example of a contention mechanism to address blindness.

FIG. 17 is a diagram 1700 illustrating yet another example of a contention mechanism to address blindness. In this example, an eNB 1702 may switch from a beam communicating with a UE 1704 to another beam communicating with another UE at time T1. At time T1, the eNB 1702 may send a message (e.g., a channel reservation transmission) to the UE 1704 to inform the UE 1704 that the eNB 1702 will tune back to the UE 1704 at time T2. As a result, a nearby UE 1706 may back off a link setup attempt with an eNB 1708. The UE 1706 may inform the eNB 1708 (e.g., via a channel reservation response) not to transmit to the UE 1706 at T2, e.g., due to expected interference from the communication between the eNB 1702 and the UE 1704. In one configuration, the back-off may be a function of priority that is communicated by the eNB 1702.

Figure 18:
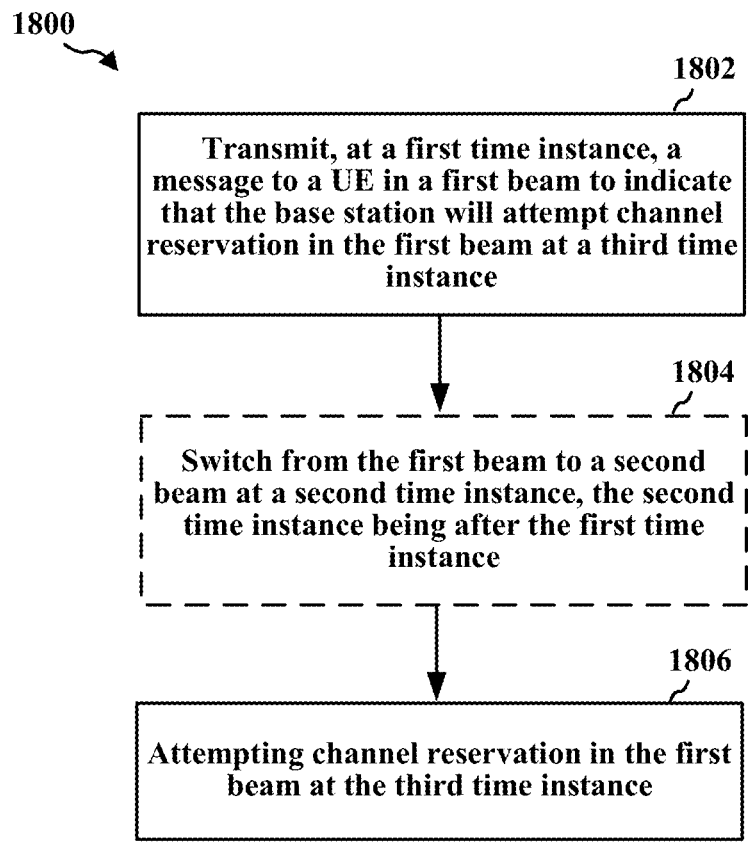
FIG. 18 is a flowchart of a method of wireless communication.

FIG. 18 is a flowchart 1800 of a method of wireless communication. The method may be performed by an eNB (e.g., the eNB 180, 310, 1502, 1602, 1702, or the apparatus 1902/1902'). The blocks illustrated with dashed lines may be optional steps of the method. At block 1802, the eNB may transmit, at a first time instance, a message to a UE in a first beam to indicate that the base station will attempt channel reservation in the first beam at a third time instance. As a result, the UE, as well as its neighbors, may be aware of the possible transmission from the eNB in the first beam at the third time instance. This may enable the UE and/or neighbors to refrain from interfering communication at the third time instance.

At block 1804, the eNB may optionally switch from the first beam to a second beam at a second time instance, the second time instance being after the first time instance, e.g., as described in connection with FIGS. 15, 16, and 17. The second time instance may be after the first time instance.

At block 1806, the eNB may attempt channel reservation in the first beam at the third time instance. If the channel reservation is successful, the eNB may transmit signals in the first beam.

In one configuration, the eNB may receive a message from the UE to approve transmission to the UE at the second time instance, e.g., as described in connection with FIG. 15. In another configuration, the eNB may receive a message from a second UE to impact (e.g., reject or postpone) transmission to the UE at the second time instance, e.g., as described in connection with FIG. 16. In yet another configuration, a second UE may, at the second time instance, back off or otherwise refrain from reserving the first beam in a way that overlaps with the channel reservation of the base station, e.g., as described in connection with FIG. 17. For example, the second UE may transmit a message to a second base station or reject or postpone transmission from the second base station at the second time instance.

Figure 19:
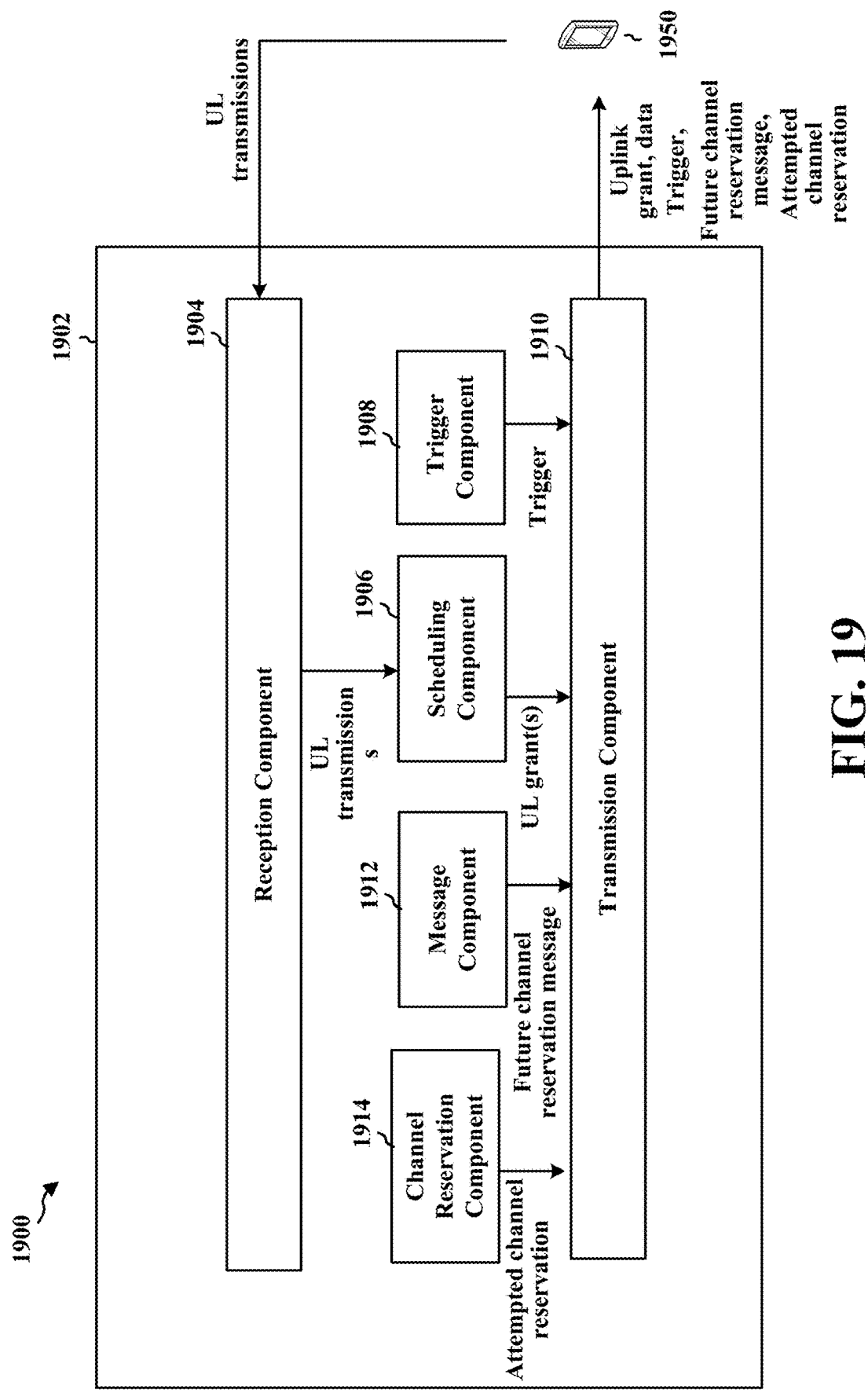
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus 1902 may be an eNB (e.g., eNB 102, 180, 310, 430, 802, 902, 1002, 1102, 1502, 1602, 1702). The apparatus 1902 may include a reception component 1904 that receives UL control or data from a UE(s) 1950. The apparatus 1902 may include a transmission component 1910 to transmit DL control or data to the UE 1950. The apparatus 1902 may include a scheduling component 1906 that schedules multiple UEs in a mmW communication system. The scheduling component 1906 may receive UL control from the reception component 1904 and send DL control to the transmission component 1910.

In one example, the transmission component 1910 may transmit an UL grant to a UE during a first TxOP and a trigger component 1908 may be configured to signal, during a second TxOP, a grant trigger to the UE(s) 1950 to transmit uncomplete UL transmissions from the first TxOP. The scheduling component 1906 may also be configured to instruct the UE regarding whether to keep or discard resources granted by the uplink grant when the UE switches to a different beam during or prior to the second transmit opportunity.

In another example, the scheduling component 1906 may be configured to simultaneously schedule a first UE in a first beam and a second UE in a second beam. The reception component 1904 may be configured to receive, from the first UE, a first channel reservation response for a first set of resources in the first beam during a first transmit opportunity; and receive, from the second UE, a second channel reservation response for a second set of resources in the second beam during a second transmit opportunity. The transmission component 1910 may be configured to transmit, to the first UE, a first data using the first set of resources in the first beam during the first transmit opportunity; and transmit, to the second UE, a second data using the second set of resources in the second beam during the second transmit opportunity. The reception component may be further configured to receive a first uplink control channel in the first beam from the first UE; and receive a second uplink control channel in the second beam from the second UE, wherein the first uplink control channel and the second uplink control channel are multiplexed on a same transmission interval during the second transmit opportunity.

In another example, the transmission component 1910 may be configured to transmit a first data to a first UE in a first beam during a first transmit opportunity and to transmit a second data to a second UE in a second beam during the first transmit opportunity. Trigger component 1908 may be configured to signal, during a second transmit opportunity, a trigger to the first UE and the second UE to trigger uplink control information associated with the first data and the second data, the trigger associated with a set of UEs comprising the first UE and the second UE.

In another example, a message component 1912 may be configured to transmit, at a first time instance, a message to a UE in a first beam to indicate that the base station will attempt channel reservation in the first beam at a second time instance. A channel reservation component 1914 may attempt the channel reservation in the first beam at the second time instance.

The apparatus may include additional components that perform each of the blocks of the algorithm in the aforementioned flowcharts of FIGS. 6, 7, 12, 14, 18. As such, each block in the aforementioned flowcharts of FIGS. 6, 7, 12, 14, 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
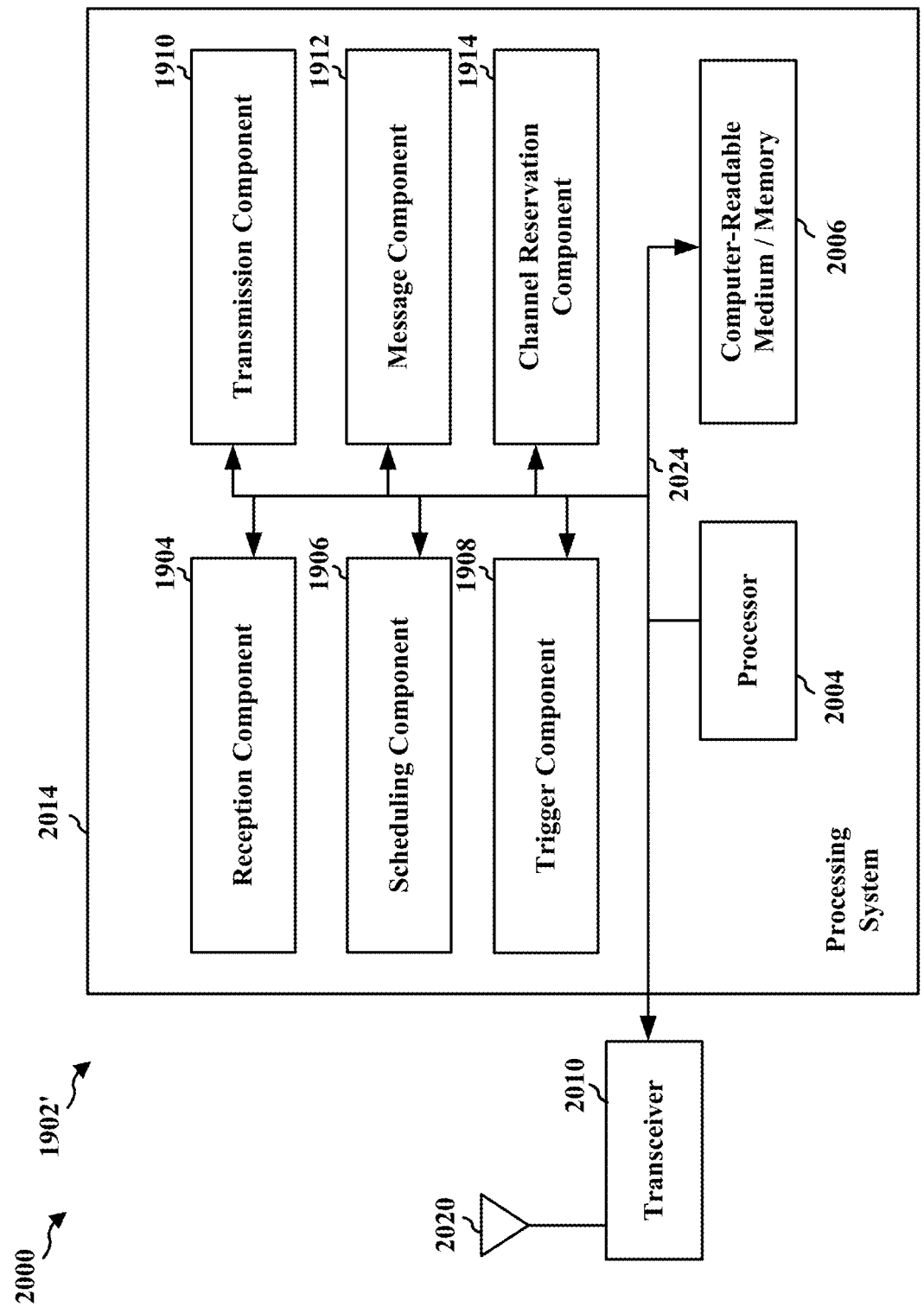
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, 1914 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006.

The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912, 1914. The components may be software components running in the processor 2004, resident/stored in the computer readable medium/memory 2006, one or more hardware components coupled to the processor 2004, or some combination thereof. The processing system 2014 may be a component of the eNB 310 and may include the memory 376 and/or at least one of the TX processor 316, the RX processor 370, and the controller/processor 375.

In one configuration, the apparatus 1902/1902' for wireless communication may include means for transmitting an uplink grant to a UE during a first transmit opportunity. In one configuration, the apparatus 1902/1902' may include means for signaling, during a second transmit opportunity, a grant trigger to the UE to trigger operations associated with the uplink grant that are uncompleted after the first transmit opportunity. In one configuration, the apparatus 1902/1902' may include means for instructing the UE regarding whether to keep or discard resources granted by the uplink grant when the UE switches to a different beam during or prior to the second transmit opportunity.

In one configuration, the apparatus 1902/1902' may include means for simultaneously scheduling a first UE in a first beam and a second UE in a second beam. In one configuration, the apparatus 1902/1902' may include means for receiving, from the first UE, a first channel reservation response for a first set of resources in the first beam during a first transmit opportunity. In one configuration, the apparatus 1902/1902' may include means for receiving, from the second UE, a second channel reservation response for a second set of resources in the second beam during a second transmit opportunity.

In one configuration, the apparatus 1902/1902' may include means for transmitting, to the first UE, a first data using the first set of resources in the first beam during the first transmit opportunity. In one configuration, the apparatus 1902/1902' may include means for transmitting, to the second UE, a second data using the second set of resources in the second beam during the second transmit opportunity. In one configuration, the apparatus 1902/1902' may include means for receiving a first uplink control channel in the first beam from the first UE. In one configuration, the apparatus 1902/1902' may include means for receiving a second uplink control channel in the second beam from the second UE.

In one configuration, the means for scheduling operates in a third beam addressing both the first UE and the second UE. In one configuration, the means for scheduling operates simultaneously in the first beam for the first UE and in the second beam for the second UE.

In one configuration, the apparatus 1902/1902' may include means for transmitting a first data to a first UE in a first beam during a first transmit opportunity. In one configuration, the apparatus 1902/1902' may include means for transmitting a second data to a second UE in a second beam during the first transmit opportunity. In one configuration, the apparatus 1902/1902' may include means for signaling, during a second transmit opportunity, a trigger to the first UE and the second UE to trigger uplink control information associated with the first data and the second data.

In one configuration, the apparatus 1902/1902' may include means for transmitting, at a first time instance, a message to a UE in a first beam to indicate that the base station will attempt channel reservation in the first beam at a second time instance. In one configuration, the apparatus 1902/1902' may include means for attempting the channel reservation in the first beam at the second time instance. In one configuration, the apparatus 1902/1902' may include means for switching from the first beam to a second beam at a third time instance.

In one configuration, the apparatus 1902/1902' may include means for receiving a message from the UE to approve transmission to the UE at the second time instance. In one configuration, the apparatus 1902/1902' may include means for receiving a message from a second UE to impact (e.g., reject or postpone) transmission to the UE at the second time instance.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 21:
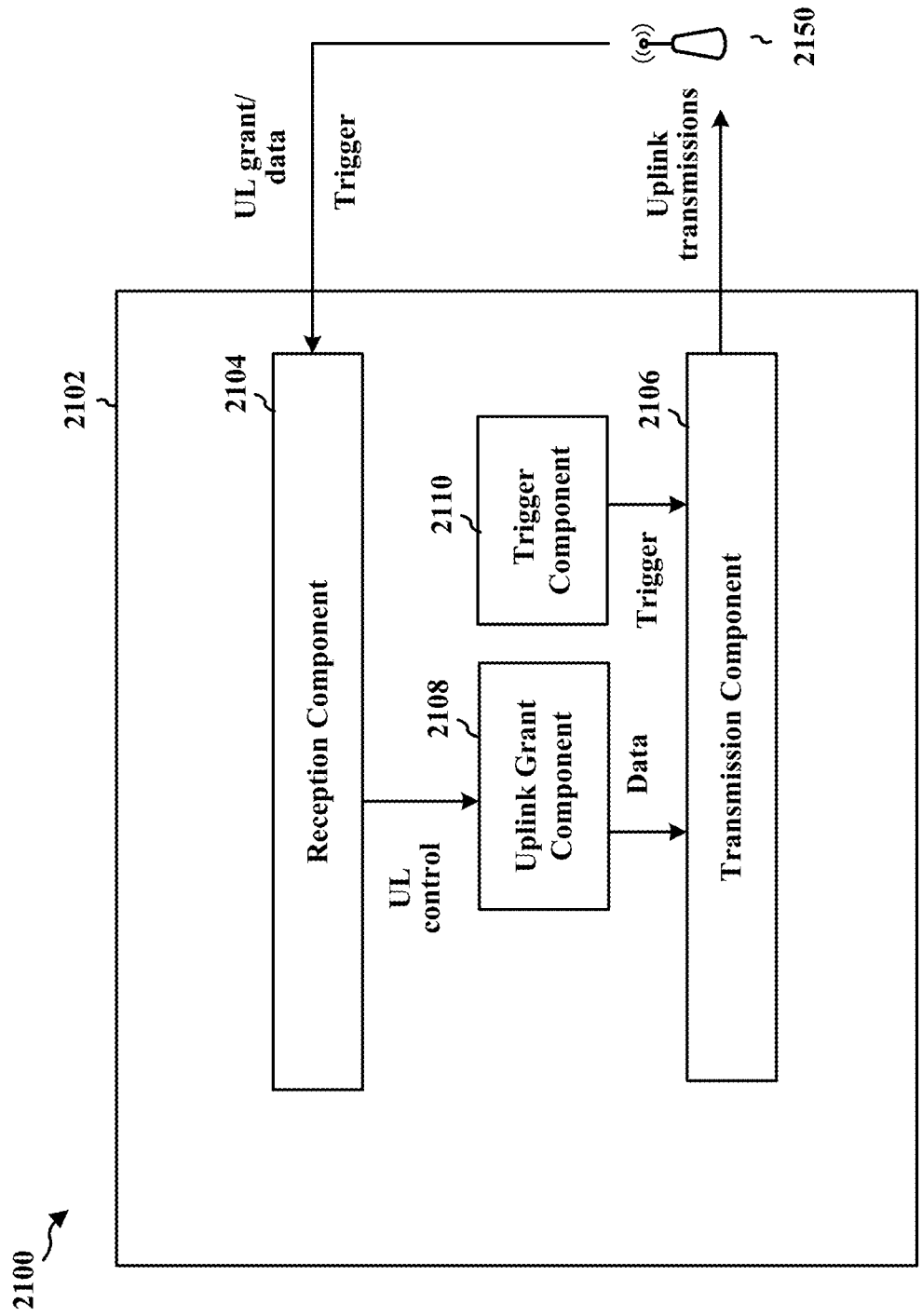
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a UE (e.g., UE 104, 350, 432, 436, 804, 806, 904, 906, 1004, 1006, 1104, 1106, 1504, 1506, 1604, 1606, 1704, 1706, 1950). The apparatus includes a reception component 2104 that receives downlink communication from a base station 2150, and a transmission component 2106 that transmits uplink communication to base station 2150. An uplink grant component 2108 may be configured to receive an uplink grant from a base station during a first transmit opportunity. The uplink grant may be for a data transmission that cannot be completed during the first transmission opportunity. The transmission component may be configured to refrain from continuing to transmit the data transmission in the second transmission opportunity, e.g., until a grant trigger is received by a trigger component 2110 configured to receive a grant trigger from the base station during a second transmit opportunity, the grant trigger associated with a set of UEs. The apparatus may then perform operations associated with the uplink grant that are uncompleted after the first transmit opportunity when the set of UEs includes the UE. For example, the UE may transmit the data according to the uplink grant in the first transmission opportunity after receiving the grant trigger during the second transmission opportunity.

The apparatus may include additional components that perform each of the blocks of the algorithm in the aforementioned flowchart of FIG. 7, as well as the UE aspects described in connection with FIGS. 4, 5, 8-11B, 13, and 15-17. As such, each block in the aforementioned flowchart of FIG. 7, as well as the UE aspects described in connection with FIGS. 4, 5, 8-11B, 13, and 15-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
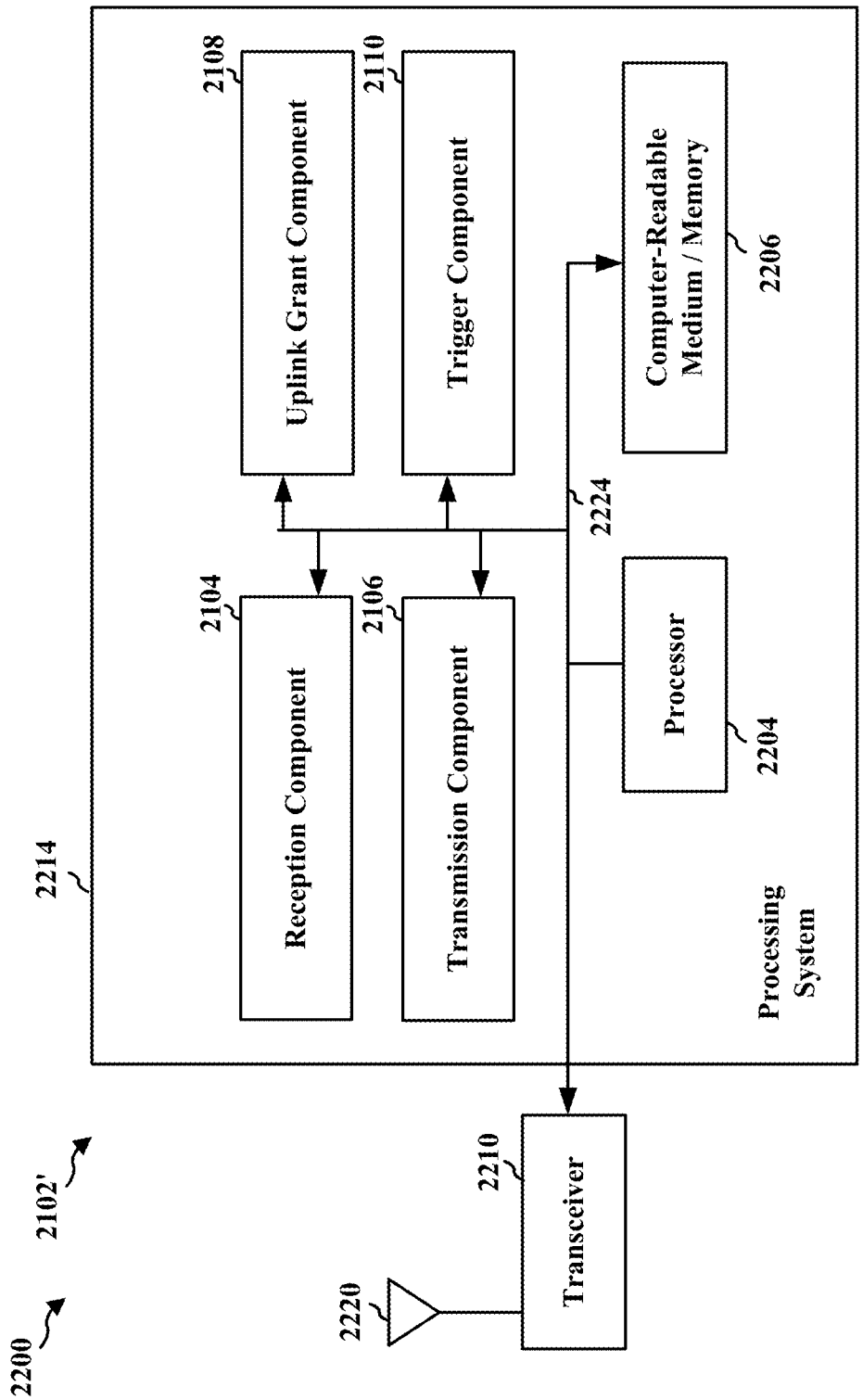
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359.

In one configuration, the apparatus 2102/2102' for wireless communication includes means for receiving an uplink grant from a base station during a first transmit opportunity, means for receiving a grant trigger from the base station during a second transmit opportunity, and means for performing operations associated with the uplink grant that are uncompleted after the first transmit opportunity when the set of UEs includes the UE. The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
    transmitting an uplink grant to a user equipment (UE) during a first transmit opportunity; and
    signaling, during a second transmit opportunity, a grant trigger associated with a set of UEs comprising the UE to trigger operations associated with the uplink grant that are uncompleted after the first transmit opportunity, the set of UEs being a subset of UEs having pending transmissions.

2. The method of claim 1, wherein the second transmit opportunity follows the first transmit opportunity.

3. The method of claim 1, wherein the grant trigger includes an identifier of a beam used by the UE, and wherein the identifier of the beam indicates that the grant trigger is associated with the set of UEs.

4. The method of claim 1, wherein the grant trigger includes a bitmap or a grouping that maps to the set of UEs, wherein the set of UEs has common spatial characteristics and includes the UE.

5. The method of claim 1, wherein the grant trigger is transmitted via a new radio common physical downlink control channel (NR-CPDCCH).

6. The method of claim 1, further comprising:
instructing the UE regarding whether to keep or discard resources granted by the uplink grant when the UE switches to a different beam during or prior to the second transmit opportunity.

7. An apparatus for wireless communication of a base station, comprising:
a memory; and
at least one processor coupled to the memory and configured to:
transmit an uplink grant to a user equipment (UE) during a first transmit opportunity; and
signal, during a second transmit opportunity, a grant trigger associated with a set of UEs comprising the UE to trigger operations associated with the uplink grant that are uncompleted after the first transmit opportunity, the set of UEs being a subset of UEs having pending transmissions.

8. The apparatus of claim 7, wherein the at least one processor is further configured to:
instruct the UE regarding whether to keep or discard resources granted by the uplink grant when the UE switches to a different beam during or prior to the second transmit opportunity.

9. A method of wireless communication of a user equipment (UE), comprising:
receiving an uplink grant from a base station during a first transmit opportunity;
receiving a grant trigger from the base station during a second transmit opportunity, the grant trigger associated with a set of UEs; and
performing operations associated with the uplink grant that are uncompleted after the first transmit opportunity when the set of UEs includes the UE.

10. The method of claim 9, wherein the second transmit opportunity follows the first transmit opportunity.

11. The method of claim 9, wherein the set of UEs includes the UE when the grant trigger includes an identifier of a beam used by the UE.

12. The method of claim 9, wherein the set of UEs includes the UE when the grant trigger includes a bitmap or a grouping that maps to the UE, wherein the set of UEs has common spatial characteristics.

13. The method of claim 9, wherein the grant trigger is received via a new radio common physical downlink control channel (NR-CPDCCH).

14. The method of claim 9, further comprising:
receiving, from the base station, a signal regarding whether to keep or discard resources granted by the uplink grant when the UE changes spatial dimension prior to or during the second transmit opportunity.

15. An apparatus for wireless communication of a user equipment (UE) comprising:
a memory; and
at least one processor coupled to the memory and configured to:
receive an uplink grant from a base station during a first transmit opportunity;
receive a grant trigger from the base station during a second transmit opportunity, the grant trigger associated with a set of UEs; and
perform operations associated with the uplink grant that are uncompleted after the first transmit opportunity when the set of UEs includes the UE.

16. The apparatus of claim 15, wherein the at least one processor is further configured to:
receive, from the base station, a signal regarding whether to keep or discard resources granted by the uplink grant when the UE changes spatial dimension prior to or during the second transmit opportunity.

* * * * *